United States Patent
Dziuk

(10) Patent No.: US 12,254,499 B2
(45) Date of Patent: Mar. 18, 2025

(54) ONLINE MARKETPLACE WITH SELLER FINANCING

(71) Applicant: Mark V. Dziuk, Napa, CA (US)

(72) Inventor: Mark V. Dziuk, Napa, CA (US)

(*) Notice: Subject to any disclaimer, the term of this patent is extended or adjusted under 35 U.S.C. 154(b) by 0 days.

(21) Appl. No.: 18/331,233

(22) Filed: Jun. 8, 2023

(65) Prior Publication Data

US 2023/0410168 A1    Dec. 21, 2023

Related U.S. Application Data

(63) Continuation of application No. 17/335,935, filed on Jun. 1, 2021, now Pat. No. 11,704,710, which is a continuation of application No. 16/503,171, filed on Jul. 3, 2019, now Pat. No. 11,055,773, which is a continuation of application No. 15/326,918, filed as application No. PCT/US2015/040938 on Jul. 17,
(Continued)

(51) Int. Cl.
*G06Q 30/0601* (2023.01)
*G06Q 40/03* (2023.01)

(52) U.S. Cl.
CPC ..... *G06Q 30/0609* (2013.01); *G06Q 30/0613* (2013.01); *G06Q 30/0619* (2013.01); *G06Q 40/03* (2023.01)

(58) Field of Classification Search
CPC .......... G06Q 30/0609; G06Q 30/0613; G06Q 30/0619; G06Q 40/03
USPC ...................................................... 705/3–44
See application file for complete search history.

(56) References Cited

U.S. PATENT DOCUMENTS 6,839,690 B1    1/2005    Foth
6,856,963 B1    2/2005    Hurwitz
(Continued)

FOREIGN PATENT DOCUMENTS

JP    2001-344456 A    12/2001
JP    2003-263478 A    9/2003
(Continued)

OTHER PUBLICATIONS

"Online Ordering Platform features mobile-ready interface", Product News Network: NA. Thomas Industrial Network, Inc., Dialog Accession No. 382494965, Sep. 16, (Year: 2014).*
(Continued)

*Primary Examiner* — Frantzy Poinvil
(74) *Attorney, Agent, or Firm* — Merchant & Gould P.C.

(57) ABSTRACT

An online marketplace system generates an online marketplace for seller-financed transactions. The system includes a plurality of listings of transaction offerings that are available. The transaction offerings are listed by a plurality of users and are from a plurality of different categories of products and services. The transaction offerings include a plurality of transaction terms, including payment and seller-financing terms. A transaction engine facilitates the negotiation of transaction terms between users and the formation of agreement between users. Transaction coins are awarded during the successful performance of a transaction according to the agreed upon transaction terms. A reputation engine generates trust profiles and trust scores for users. The trust profiles and trust scores are used by parties to evaluate the trustworthiness of the other party. A user interface engine generates a user interface that includes listings from users and trust scores of those users.

19 Claims, 16 Drawing Sheets

Related U.S. Application Data 2015, now Pat. No. 10,387,950, which is a continuation-in-part of application No. 14/335,634, filed on Jul. 18, 2014, now Pat. No. 9,501,791.

(56) References Cited

U.S. PATENT DOCUMENTS

| | | |
|---|---|---|
| 6,934,691 B1 | 8/2005 | Simpson |
| 6,993,685 B2 | 1/2006 | Ramaswamy et al. |
| 7,065,494 B1 | 6/2006 | Evans |
| 7,069,242 B1 | 6/2006 | Sheth et al. |
| 7,340,434 B2 | 3/2008 | Schnall |
| 7,480,638 B1 | 1/2009 | Sze |
| 7,617,128 B2 | 11/2009 | Greak |
| 7,702,552 B2 | 4/2010 | Schnall |
| 7,734,501 B2 | 6/2010 | Hahn et al. |
| 7,881,995 B2 | 2/2011 | Grimberg |
| 7,938,316 B2 | 5/2011 | Bennett et al. |
| 8,046,265 B2 | 10/2011 | Van Luchene et al. |
| 8,078,524 B2 | 12/2011 | Crawford et al. |
| 8,275,636 B2 | 9/2012 | Berg et al. |
| 8,332,294 B1 | 12/2012 | Thearling |
| 8,380,591 B1 | 2/2013 | Kazenas et al. |
| 8,396,791 B2 | 3/2013 | Cotton |
| 8,423,451 B1 | 4/2013 | Flaxman et al. |
| 8,498,934 B2 | 7/2013 | Todd |
| 8,548,868 B1* | 10/2013 | Lawrence ......... G06Q 30/0605 |
| | | 705/26.4 |
| 8,554,584 B2 | 10/2013 | Hargroder |
| 8,660,943 B1 | 2/2014 | Chirehdast |
| 8,682,911 B2 | 3/2014 | Widjojo et al. |
| 8,706,624 B2 | 4/2014 | Don et al. |
| 8,725,605 B1 | 5/2014 | Plunkett |
| 8,725,651 B2 | 5/2014 | Staddon et al. |
| 8,738,477 B2 | 5/2014 | Lefebvre et al. |
| 8,744,944 B2 | 6/2014 | Haggerty et al. |
| 8,762,259 B1 | 6/2014 | Tyo et al. |
| 8,762,261 B2 | 6/2014 | Haggerty et al. |
| 8,781,954 B2 | 7/2014 | Haggerty et al. |
| 8,793,174 B1 | 7/2014 | Wehunt et al. |
| 8,949,338 B2 | 2/2015 | Ahmed et al. |
| 9,177,315 B2 | 11/2015 | Pitroda et al. |
| 9,299,071 B1* | 3/2016 | Klingen ............... G06Q 20/327 |
| 9,665,859 B2 | 5/2017 | Imrey et al. |
| 9,785,934 B2 | 10/2017 | Davis et al. |
| 9,846,900 B2 | 12/2017 | Ahmed et al. |
| 10,621,657 B2* | 4/2020 | Kasower ................ G06Q 30/06 |
| 2001/0039516 A1 | 11/2001 | Bennett et al. |
| 2002/0029187 A1 | 3/2002 | Meehan et al. |
| 2003/0074298 A1 | 4/2003 | Daum |
| 2004/0010463 A1 | 1/2004 | Hahn-Carlson et al. |
| 2006/0015421 A1 | 1/2006 | Grimberg |
| 2006/0015435 A1 | 1/2006 | Nathanson |
| 2006/0111986 A1 | 5/2006 | Yorke et al. |
| 2006/0167756 A1 | 7/2006 | Vonbergen et al. |
| 2007/0136074 A1 | 6/2007 | Hahn et al. |
| 2008/0086397 A1 | 4/2008 | Hahn-Carlson |
| 2008/0208749 A1 | 8/2008 | Wallace et al. |
| 2008/0301055 A1 | 12/2008 | Borgs et al. |
| 2009/0254447 A1 | 10/2009 | Blades |
| 2009/0254477 A1* | 10/2009 | Kramer ................ G06Q 40/00 |
| | | 705/40 |
| 2011/0138318 A1 | 6/2011 | Grimberg |
| 2012/0209970 A1 | 8/2012 | Scipioni et al. |
| 2012/0239552 A1 | 9/2012 | Harycki |
| 2012/0246063 A1 | 9/2012 | Bennett |
| 2013/0290127 A1 | 10/2013 | Finseth |
| 2014/0025563 A1 | 1/2014 | Bennett |
| 2014/0025573 A1 | 1/2014 | Keronen et al. |
| 2014/0280568 A1 | 9/2014 | Postrel |
| 2015/0081349 A1* | 3/2015 | Johndrow ............. G06Q 20/405 |
| | | 705/5 |
| 2015/0193873 A1 | 7/2015 | Hammock et al. |
| 2015/0254645 A1* | 9/2015 | Bondesen ............ G06Q 20/385 |
| | | 705/41 |
| 2015/0254698 A1* | 9/2015 | Bondesen .............. G06Q 20/36 |
| | | 705/14.17 |
| 2016/0125492 A1* | 5/2016 | Walker ............... G06Q 30/0613 |
| | | 705/26.41 |
| 2017/0123282 A1 | 5/2017 | Tsuruma |
| 2018/0047096 A1 | 2/2018 | Xu |
| 2018/0165758 A1* | 6/2018 | Saxena .................. G06N 20/00 |
| 2022/0198543 A1 | 6/2022 | Jones et al. |
| 2022/0245638 A1* | 8/2022 | Ozvat .................... G06Q 20/20 |

FOREIGN PATENT DOCUMENTS

| | | |
|---|---|---|
| JP | 2003271780 A | 9/2003 |
| JP | 2004-199499 A | 7/2004 |
| JP | 2013-536499 A | 9/2013 |
| JP | 2014-099050 A | 5/2014 |
| JP | 2017-523193 A | 8/2017 |
| WO | 2006092726 A2 | 9/2006 |
| WO | 2012-012186 A1 | 1/2012 |

OTHER PUBLICATIONS

Lambert, "Managing receivables in the digital economy", Business Credit 104.9: 37(7) National Association of Credit Management, October (Year: 2002).*

International Search Report and Written Opinion for Application No. PCT/US2015/040938 mailed on Oct. 28, 2015.

Payolution Gmbh, Payolution helps you to buy in your favourite online shops, 2014, 1 pg.

Ebay, eBays's reputation mechanism, accessed on or before May 9, 2014, 62 pgs.

Extended European Search Report for corresponding European Patent Application No. 15821425.4 mailed Nov. 27, 2017, 10 pages.

Online Ordering Platform features mobile-ready interface, Product News Network: NA., Thomas Industrial Network, Inc., Sep. 16, 2014.

Lambert, Pete, "Managing receivables in the digital economy", Business Credit 104.9:37(7), National Association of Credit Management, Oct. 2002.

Khawaja et al., "Organizational Interventions and the Successful Implementation of Customer Relationship Management (CRM) System Projects", Database for Advances in Information Systems; New York, vol. 42, Iss. 2, May (Year: 2011).

ownerwillcarry.com; Owner Financed Mortgages, Creatively Bridging the Gap Between Buyer and Seller, 2014, 1 page.

IOffer; http://en.wikipedia.org/wiki/IOffer; May 3, 2014, 3 pages.

Ioffer; www.ioffer.com; May 3, 2014, 5 pages.

Weintraub, Elizabeth; About.com; Owner Financing in Real Estate—Buying a Home With Owner Financing; May 3, 2014; 3 pages.

flexshopper.com; http://www.flexshopper.com/?FSCODE=PPCGOOG002&gclid=CKTnkrFkL4CFeZDMgodhEsApw; May 3, 2014; 6 pages.

European Patent Office, Extended Search Report for application No. 22187829.1 mailed Jan. 19, 2023, 7 pages.

* cited by examiner

ONLINE MARKETPLACE WITH SELLER FINANCING

CROSS-REFERENCE TO RELATED APPLICATIONS

This application is a continuation of U.S. patent application Ser. No. 17/335,935, filed Jun. 1, 2021, now U.S. Pat. No. 11,704,710, which is a continuation of U.S. patent application Ser. No. 16/503,171, filed Jul. 3, 2019, now U.S. Pat. No. 11,055,773, which is a continuation of U.S. patent application Ser. No. 15/326,918, filed Jan. 17, 2017, now U.S. Pat. No. 10,387,950, which is a U.S. National Stage Application of PCT/US2015/040938, filed Jul. 17, 2015, which is a Continuation-In-Part of U.S. patent application Ser. No. 14/335,634, filed Jul. 18, 2014, now U.S. Pat. No. 9,501,791, the disclosures of which are hereby incorporated by reference in their entireties. To the extent appropriate, a claim of priority is made to each of the above disclosed applications.

BACKGROUND

Marketplaces provide a forum for the exchange of goods and services. Marketplaces ease the exchange of goods and services by providing a common meeting place where those interested in buying or selling can come together to seek mutually beneficial transactions.

In addition to physical marketplaces, the Internet also allows buyers and sellers to gather in online marketplaces. Online marketplaces have some advantages over physical marketplaces. One advantage is that the buyer and seller do not have to be physically in the same location. Another advantage is that an online marketplace may bring together a much larger number of people, increasing the likelihood that buyers and sellers will be able to find mutually beneficial transactions.

SUMMARY

In general terms, this disclosure is directed to an online marketplace in which transaction offerings are made available with seller-financing. In one possible configuration and by non-limiting example, the online marketplace includes listings for transaction offerings that include transaction terms, including seller-financing terms. Various aspects are described in this disclosure, which include, but are not limited to, the following aspects.

One aspect is an online marketplace system comprising: at least one processing device; and at least one computer readable storage device storing data instructions that, when executed by the at least one processing device, cause the at least one processing device to generate an online marketplace for seller-financed transactions, the online marketplace comprising: a plurality of listings of transaction offerings that are available from sellers over time for at least two payments, wherein the listings of transaction offerings include transaction offerings across a plurality of different transaction offering categories; a reputation engine configured to generate and store trust profiles for users of the online marketplace, the trust profiles configured to allow both buyers and sellers to evaluate trustworthiness of each other prior to entering into seller-financed transactions; a transaction engine configured to interact with the buyers and sellers to define terms of the seller-financed transactions; and a payment engine configured to monitor compliance with the terms of the seller-financed transactions including receipt of payments over time from the buyers.

Another aspect is an online marketplace system for seller-financed transactions, the marketplace system comprising: at least one processing device; and at least one computer readable storage device storing instructions that, when executed by the at least one processing device, cause the at least one processing device to generate an online marketplace to: receive descriptions of a plurality of transaction offerings from a plurality of seller users of the online marketplace, wherein the transaction offerings are available from the seller users over time for a plurality of payments; generate a plurality of listings, each of the listings including one of the descriptions of the plurality of transactions offerings, wherein the plurality of listings are associated with transaction offerings across a plurality of different transaction offering categories; present at least some of the plurality of listings to buyer users; and facilitate negotiation of binding contracts between the buyer users and the seller users for transfer of the transaction offerings from the seller users to the buyer users, wherein the binding contracts define payment terms, and wherein the payment terms include prices and seller-financing terms including at least two payments to be made by the buyer users to the seller users over a period of time.

Yet another aspect is a method of facilitating online transactions involving seller financing in an online marketplace, the method comprising: receiving descriptions of a plurality of transaction offerings from a plurality of seller users of the online marketplace, wherein the transaction offerings are available for purchase from the seller users over time for at least two payments; generating a plurality of listings using at least one computing device, each of the listings including one of the descriptions of the plurality of transactions offerings, wherein the plurality of listings are associated with transaction offerings across a plurality of different transaction offering categories; presenting at least some of the plurality of listings to buyer users; and facilitating negotiation of binding contracts between the buyer users and the seller users for the transfer of the transaction offerings from the seller users to the buyer users, wherein the binding contracts define payment terms, and wherein the payment terms include prices and seller-financing terms including at least two payments made by the buyer users to the seller users over a period of time.

A further aspect is a method of facilitating online transactions involving seller financing, the method comprising: receiving a listing from a seller, using at least one computing device, the listing including: a description of a product; a photograph of the product; and proposed seller-financing terms, including at least a price, a monthly payment amount, and a period of time for the monthly payments; presenting the listing to a buyer; presenting a trust profile of the seller to the buyer, the trust profile including: reputation data including: reputational factors, including: at least one rating of at least one of the seller's prior transactions, from another user; historical data about the seller's conformance to terms of the seller's prior transactions; and information about a verification level of the seller; and a trust score computed based on at least some of the reputational factors, including a number of the seller's prior transactions; and a transaction coins element representing a quantity of transaction coins that have been earned by the seller; receiving an offer to enter into a transaction to purchase the product from the buyer according to the proposed seller-financing terms; presenting the offer to the seller; presenting a trust profile of the buyer to the seller; receiving an acceptance from the seller to define a binding contract with final seller-financing terms between the seller and the buyer using the at least one computing device; managing conformance of the seller and the buyer to the seller-financing terms of the contract using the at least one computing device; and updating the trust profiles of the seller and the buyer based on the conformance of the seller and the buyer to the seller-financing terms of the contract.

A further aspect is a method of facilitating online transactions involving seller financing, the method comprising: receiving a listing from a seller, using at least one computing device, the listing including: a description of a product; a photograph of the product; and proposed seller-financing terms, including at least a price, a payment amount, a payment frequency, and a number of payments; presenting the listing to a buyer; presenting a trust profile of the seller to the buyer, the trust profile including: reputation data including: reputational factors, including: at least one rating of at least one of the seller's prior transactions, from another user; historical data about the seller's conformance to terms of the seller's prior transactions; and information about a verification level of the seller; and a trust score computed based on at least some of the reputational factors, including a number of the seller's prior transactions; and a transaction coins element representing a quantity of transaction coins that have been earned by the seller; receiving an offer to enter into a transaction to purchase the product from the buyer according to the proposed seller-financing terms; presenting the offer to the seller; presenting a trust profile of the buyer to the seller; receiving an acceptance from the seller to define a binding contract with final seller-financing terms between the seller and the buyer using the at least one computing device; managing conformance of the seller and the buyer to the seller-financing terms of the contract using the at least one computing device; and updating the trust profiles of the seller and the buyer based on the conformance of the seller and the buyer to the seller-financing terms of the contract.

Another aspect is a system for facilitating transactions comprising: at least one processing device; and at least one computer readable storage device storing data instructions that, when executed by the at least one processing device, cause the at least one processing device to generate an online marketplace for seller-financed transactions, the online marketplace comprising: a transaction engine configured to receive a transaction offering from an external location and to interact with a buyer user and seller user to define payment terms for the transaction offering, wherein the payment terms include prices and seller-financing terms including at least two payments made by the buyer user to the seller user over a period of time; and a payment engine configured to monitor compliance with the payment terms including receipt of payments over time from the buyer user.

Yet another aspect is a method of facilitating online transactions involving seller financing, the method comprising: receiving, from an external location, a transaction offering being offered by a seller user; and facilitating negotiation of a binding contract between a buyer user and the seller user for the transfer of the transaction offerings from the seller user to the buyer user, wherein the binding contract defines payment terms, and wherein the payment terms include prices and seller-financing terms including at least two payments made by the buyer user to the seller user over a period of time.

DETAILED DESCRIPTION

Figure 1:
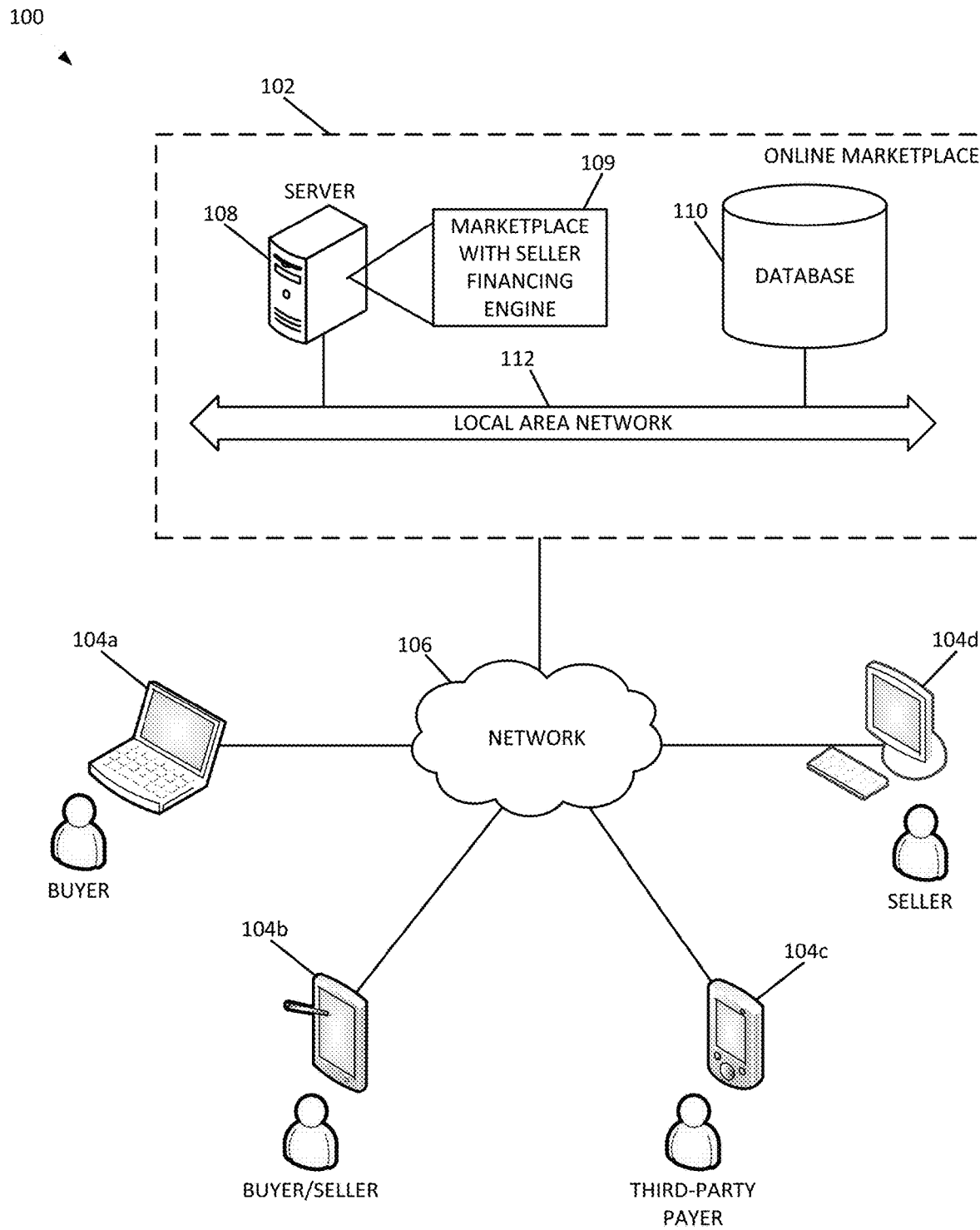
FIG. 1 is a schematic block diagram illustrating an example of a system for providing an online marketplace.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to systems and methods associated with a seller-financed, online marketplace for a plurality of different types of transaction offerings. Examples of transaction offerings include goods and services. Examples of goods include products and commodities. In at least some embodiments, the online marketplace allows users to post advertisements for transaction offerings that the user would like to sell or lease. Similarly, in some embodiments the online marketplace allows users to post requests for transaction offerings that the user would like to acquire (or lease). In addition to posting a description of the transaction offering that the user wishes to sell or acquire, the marketplace allows the user to specify payment terms for the transaction offering as well. Examples of payment terms include price, down payment amount, interest rate, number of payments, payment frequency, and date of first payment. The marketplace allows the user to specify other terms as well, such as delivery preference and whether layaway is available. Additionally, in some embodiments, the marketplace also allows users to donate a transaction offering to another user.

The marketplace also operates in at least some embodiments to allow users to make offers and counter-offers to each other that specify the terms of a potential transaction for the transaction offering. Although many of the examples described herein relate to transactions for a single transaction offering, some embodiments operate to bundle transactions offerings from one or multiple users. It should be understand that the various descriptions herein are applicable to bundled transactions as well as transactions involving a single transaction offering.

The marketplace operates to maintain profile information about users. Examples of profile information include the number of previous transactions that have been completed successfully or unsuccessfully, reviews and ratings of previous transactions, and badges that indicate the verification level of the user. The verification level of the user is based on the amount of identifying information the user has shared with the marketplace. In at least some embodiments, the marketplace operates to combine various different types of profile information to calculate a trust score for a user. In some embodiments profile information including reputation data is displayed in a trust profile. In some embodiments the trust profile includes a trust score. In some embodiments a trust profile includes a verification level. In some embodiments the trust profile includes transaction coins elements. Examples of trust profiles include the neighbor profiles 1148 shown in FIG. 16, and other user profiles as described herein. In some embodiments, the marketplace also includes various game-like features to encourage user to complete certain processes such as the verification process or collecting transactions coins. For example, a user may earn badges or other forms of awards for successfully completing certain processes, transactions, etc.

The marketplace operates in at least some embodiments to generate a user interface that allows users to view profile information about other users before entering into a transaction with that other user. The marketplace also operates to generate a user interface that allows a user to provide a rating for another user based on a transaction with that user. In at least some embodiments, the marketplace only allows a user to provide a single rating for another user. In this manner, the marketplace may prevent users from manipulating average ratings by entering into multiple sham transactions with one other user.

After the users have agreed to enter into a transaction with one another, the marketplace operates in at least some embodiments to allow the users to make and receive payments. In at least some embodiments, the marketplace records and tracks whether the payments are successfully made. Additionally, the marketplace can generate reminders that payments are due.

The marketplace also operates in at least some embodiments to generate a user interface that allows users to send and receive offers to change the payment terms of previously entered transactions. For example, a user can propose increasing the interest rate in exchange for delaying the start of payments.

In addition to managing transactions related to transaction offerings advertised in the marketplace, in some embodiments the marketplace manages transactions that occur off-line or even that have occurred in the past. For example, a first user may owe money (e.g., $1000) to a second user for a previous purchase. The first user and the second user may then agree to payment terms (e.g., 10 monthly payments of $100) to be made using the marketplace. In this manner, the marketplace can serve as a payment interface between parties. Beneficially, the marketplace can manage, track, and associate the performance of the payments with the profile information of the users. The marketplace can also be used to make and receive rent payments or other streams of payments that are made multiple times. In at least some embodiments, the marketplace is configured to send out payment reminders and default notifications that comply with various local laws in multiple jurisdictions. Beneficially, the marketplace can serve to enforce a payment policy while the party collecting the payments can maintain a friendly relationship with the debtor or renter, for example.

Additionally, in at least some embodiments, the marketplace also allows third-party financing. For example, third-party payer such as a bank or other lender may provide some or all of the price of a transaction offering. The third-party payer can make a payment or agree to make one or more payments to the listing user of the transaction offering on behalf of another responding user, such as a buyer. Alternatively, the third-party payer can agree to make payments to the responding user so that the responding user can then make payments to the listing user in accordance with the transaction terms. The third party payer can evaluate whether to make the payment based on the reputations (e.g., trust score) of one or both of the responding user and the listing user. In some embodiments, the responding user then makes payments to repay the third-party payer through the online marketplace. In this manner, the third-party payer provides financing for some or all of the price of the transaction offering. Beneficially, the third-party payer may profit by collecting interest. Additionally, in some embodiments, multiple third-party payers can together provide some or all of the price of a transaction offering. As another example, the third-party payer can provide or offer a credit line to all users having a trust score above a certain threshold to be used within the online marketplace.

In at least some embodiments, one or more users can agree to be responsible for the payments required for a particular transaction offering on behalf of another user. This can be beneficial if a user has not established a strong reputation. Additionally, this can be beneficial for making a gift payment and ensuring it is used for a particular purpose.

In at least some embodiments, the online marketplace operates to maintain one or more currency accounts for users as well. For example, users may deposit (or transfer) money directly into the currency account and in exchange receive currency that can be used to complete transactions on the online marketplace. In some embodiments, the currency in the account is a virtual currency maintained by the online marketplace. Additionally, in some embodiments, the online marketplace maintains accounts with funds maintained in a real currency that can be deposited or withdrawn at any time such as without completing a transaction using the online marketplace. Additionally, to facilitate transactions between users in different countries, some embodiments allow for converting between various real currencies at different exchange rates.

FIG. 1 is a schematic block diagram illustrating an example of a system 100 for providing an online marketplace. In this example, the system 100 includes the online marketplace 102, user computing devices 104a, 104b, 104c, and 104d (collectively referred to as user computing devices 104), and network 106. In this example, user computing device 104a is being used by a buyer, user computing device 104b is being used by a buyer/seller, user computing device 104c is being used by a third-party payer, and user computing device 104d is being used by a seller.

The online marketplace 102 operates to facilitate the completion of various transactions and payments between users. The online marketplace 102 includes a server 108, a database 110, and a local area network 112.

The server 108 operates to perform various processes related to facilitating the completion of transactions and payments between users. The server 108 is a computing device that includes a database software application, such as the SQL SERVER® database software distributed by MICROSOFT® Corporation. In at least some embodiments, the server 108 includes a Web server or a file server. In some embodiments, the server 108 comprises a plurality of computing devices that are located in one or more physical locations. For example, the server 108 can be a single server or a bank of servers.

In this example, the server 108 includes the marketplace with seller financing engine 109. The marketplace with seller financing engine 109 operates to generate interfaces and perform other processes associated with the online marketplace with seller financing.

The database 110 is a data storage device configured to store data related to users, transactions, and payments. Examples of the database 110 include a hard disk drive, a collection of hard disk drives, digital memory (such as random access memory), a redundant array of independent disks (RAID), optical or solid state storage devices, or other data storage devices. The data can be distributed across multiple local or remote data storage devices. The database 110 stores data in an organized manner, such as in a hierarchical or relational database structure, or in lists and other data structures such as tables. The database 110 can be stored on a single data storage device or distributed across two or more data storage devices that are located in one or more physical locations. The database 110 can be a single database or multiple databases. In at least some embodiments, the database 110 is located on the server 108.

The network 112 communicates digital data between the server 108 and the database 110. The network 112 can be a local area network or a wide area network, such as the Internet. The server 108 and the database 110 can be in the same or remote locations.

The user computing devices 104 operate to allow users to access the online marketplace 102. The user computing devices 104 are connected to the network 106. The user computing devices 104 may connect to the network using a wired or wireless interface. In some embodiments the user computing devices 104 access the online marketplace 102 through a Web interface using a Web browser. In other embodiments, the computing devices access the online marketplace 102 using an application. Other embodiments are possible as well. Sellers include lessors and buyers include lessees. In some embodiments the users including posting users and responding users. A posting user can include a seller or a buyer (e.g., when the buyer posts a want ad listing), and a responding user can include a buyer or a seller (e.g., when the seller responds to a want ad listing). Further, as discussed herein, a single user can be both a seller for one transaction offering and a buyer for another transaction offering.

The network 106 communicates digital data between one or more computing devices, such as the user computing device 104 and the server 108. The network 106 can be a local area network or a wide area network, such as the Internet. In at least some embodiments, the network 106 and the network 112 are a single network, such as the Internet or the same local area network.

Figure 2:
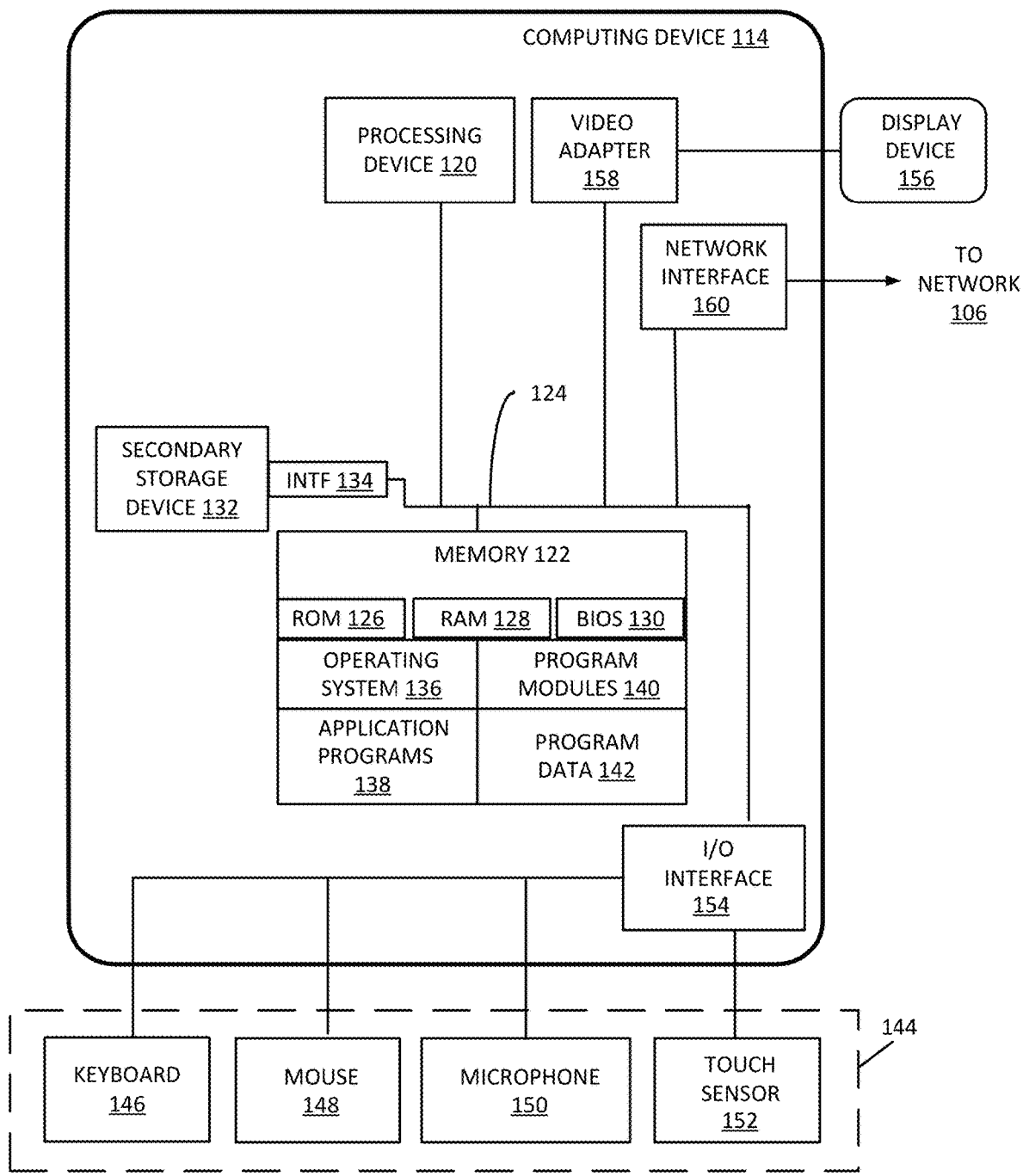
FIG. 2 illustrates an exemplary architecture of a computing device that can be used to implement aspects of the present disclosure.

FIG. 2 illustrates an exemplary architecture of a computing device 114 that can be used to implement aspects of the present disclosure, including the server 108 or the user computing devices 104. One or more computing devices, such as the type illustrated in FIG. 2, are used to execute the operating system, application programs, and software modules (including the software engines) described herein.

The computing device 114 includes, in some embodiments, at least one processing device 120, such as a central processing unit (CPU). A variety of processing devices are available from a variety of manufacturers, for example, Intel or Advanced Micro Devices. In this example, the computing device 114 also includes a system memory 122, and a system bus 124 that couples various system components including the system memory 122 to the processing device 120. The system bus 124 is one of any number of types of bus structures including a memory bus or memory controller, a peripheral bus, and a local bus using any of a variety of bus architectures.

Examples of computing devices suitable for the computing device 114 include a desktop computer, a laptop computer, a tablet computer, a mobile phone device such as a smart phone, or other devices configured to process digital instructions.

The system memory 122 includes read only memory 126 and random access memory 128. A basic input/output system 130 containing the basic routines that act to transfer information within the computing device 114, such as during start up, is typically stored in the read only memory 126.

The computing device 114 also includes a secondary storage device 132 in at least some embodiments, such as solid state memory technology, for storing digital data. The secondary storage device 132 is connected to the system bus 124 by a secondary storage interface 134. The secondary storage devices and their associated computer readable media provide nonvolatile storage of computer readable instructions (including application programs and program modules), data structures, and other data for the computing device 114.

Although the exemplary environment described herein employs solid state memory technology as a secondary storage device, other types of computer readable storage media are used in other embodiments. Examples of these other types of computer readable storage media include hard disks, magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in the secondary storage device 132 or the memory 122, including an operating system 136, one or more application programs 138, other program modules 140, and program data 142. The database 110 may be stored at any location in the memory 122, such as the program data 142, or at the secondary storage device 132.

In some embodiments, computing device 114 includes input devices 144 to enable users to provide inputs to the computing device 114. Examples of input devices 144 include a keyboard 146, pointer input device 148, microphone 150, and touch sensor 152. A touch-sensitive display device is an example of a touch sensor. Other embodiments include other input devices 144. The input devices are often connected to the processing device 120 through an input/output interface 154 that is coupled to the system bus 124. These input devices 144 can be connected by any number of input/output interfaces, such as a parallel port, serial port, game port, or a universal serial bus. Wireless communication between input devices 144 and interface 154 is possible as well, and includes infrared, BLUETOOTH® wireless technology, 802.11a/b/g/n/ac, cellular or other radio frequency communication systems in at least some possible embodiments.

In this example embodiment, a touch sensitive display device 156 is also connected to the system bus 124 via an interface, such as a video adapter 158. In some embodiments, the display device 156 is a touch sensitive display device. A touch sensitive display device includes sensors for receiving input from a user when the user touches the display or, in some embodiments, just gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 156, the computing device 114 can include various other peripheral devices (not shown), such as speakers or a printer.

When used in a local area networking environment or a wide area networking environment (such as the Internet), the computing device 114 is typically connected to the network through a network interface, such as a wireless network interface 160. Other possible embodiments use other communication devices. For example, some embodiments of the computing device 114 include an Ethernet network interface, or a modem for communicating across the network.

The computing device 114 typically includes at least some form of computer-readable media. Computer readable media includes any available media that can be accessed by the computing device 114. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile discs or other optical storage, magnetic cassettes, magnetic tape, magnetic disk storage or other magnetic storage devices, or any other medium that can be used to store the desired information and that can be accessed by the computing device 114.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 3:
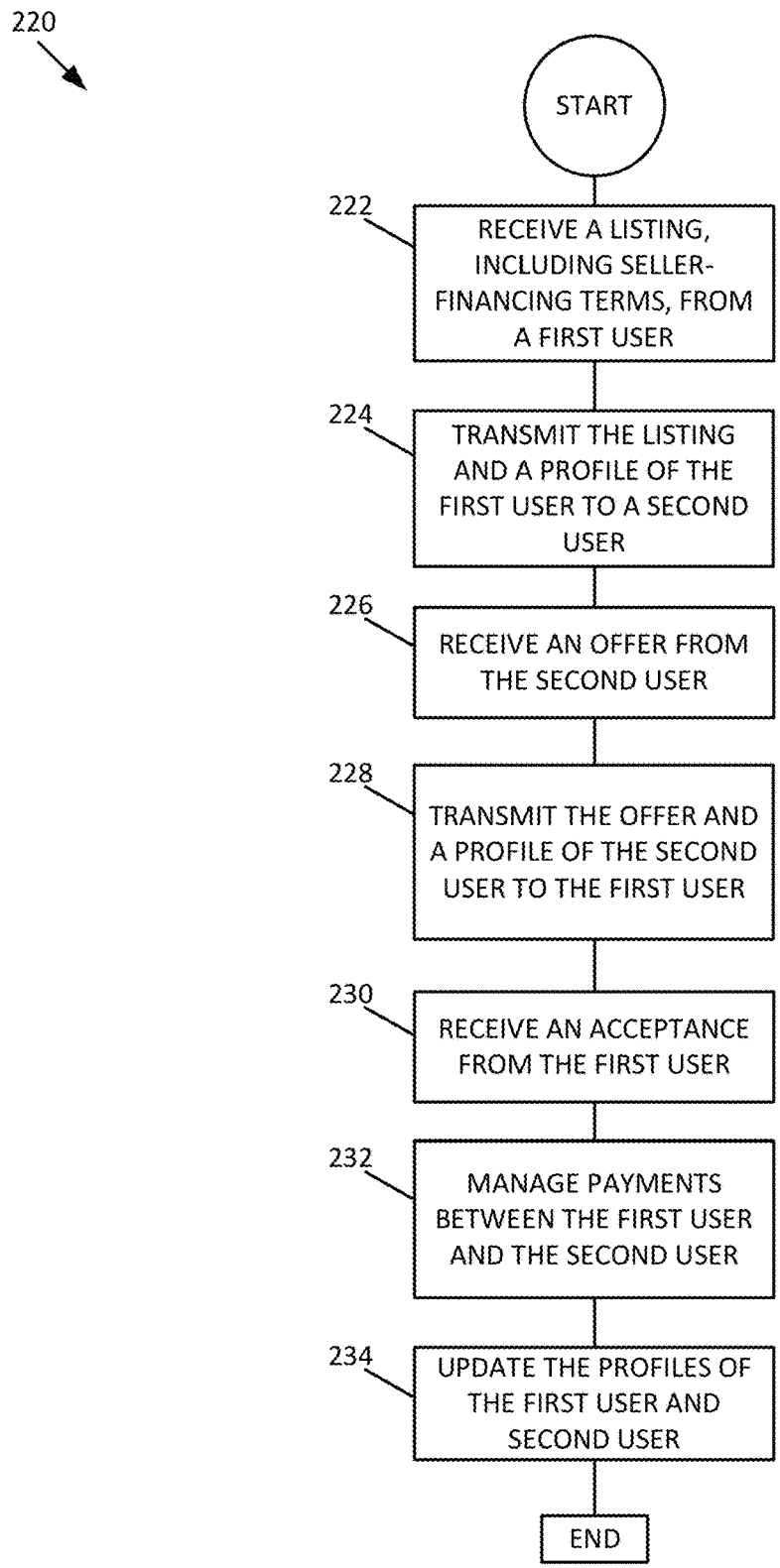
FIG. 3 is a flow chart illustrating an example method of completing a transaction using the system of FIG. 1.

FIG. 3 is a flow chart illustrating an example method 220 of completing a transaction using the system 100 between a first user and a second user. In some embodiments, the method 220 is performed by the online marketplace 102 using one or more processing devices (such as processing device 120, shown in FIG. 2). In this example, the method 220 includes operations 222, 224, 226, 228, 230, 232, and 234.

At operation 222, the online marketplace 102 receives a listing, including seller-financing terms from a first user. The listing describes a transaction offering that the first user wishes to sell or lease to another user. Alternatively, the listing describes a transaction offering that the first user wishes to buy or lease from another. The listing includes a description of the transaction offering. The description can include one or more of textual, graphic, video, and audio data relating to the transaction offering. Additionally, the description can include structured (e.g., the age of the transaction offering) and unstructured data (e.g., a narrative description of the transaction offering). In addition, to describing the transaction offering, the listing also describes payment terms, including seller-financing terms, for the transaction offering. In addition, the listing may specify that one or more of the payment terms are negotiable or that one or more of the payment terms are not negotiable. The listing is generated by the first user completing a form on a web site generated by the online marketplace 102. Alternatively, the listing is generated using other methods such as by transmitting one or more photographs of the transaction offering to the online marketplace 102. In at least some other embodiments, the listing is generated using other methods.

At operation 224, the online marketplace 102 transmits the listing and a profile of the first user to a second user. In at least some embodiments, the online marketplace 102 transmits the listing to the second user in response to a search request made by the second user. For example, the second user may enter a search term that describes an aspect of a transaction offering into a form on a web site generated by the online marketplace. Alternatively, the listing is transmitted to the second user in response to a browse request made by the second user. For example, the second user may select a category (or subcategory) of types of transaction offerings from a list on a web site generated by the online marketplace 102. As another alternative, the listing is transmitted in response to a search made using a search engine such as the BING search engine from MICROSOFT® Corporation of Redmond, Washington or the GOOGLE search engine from GOOGLE® Inc. of Mountain View, California. Additionally, the listing may be transmitted via e-mail or social media in response to a request from the first user, the second user, or another user. In at least other embodiments, the listing is transmitted using other methods.

In some embodiments the online marketplace 102 transmits a profile of the first user along with the listing. The profile includes profile information that the second user can review to determine whether to enter into a transaction with the first user. For example, the profile includes in at least some embodiments information about past transactions to which the first user has been a party. Alternatively, the online marketplace 102 may transmit a summary profile of the first user along with the listing. The summary profile may include a summary of the profile information available for the first user. For example, the summary profile may include a single score, such as a trust score (which is described in greater detail below). Additionally, in some embodiments, the profile of the first user is not transmitted with the listing. Instead, the profile of the first user is transmitted to the second user after the second user indicates a desire to the profile, such as by following a link on a web page generated by the online marketplace. Additionally, the online marketplace 102 may transmit the profile of the first user to the second user upon receiving an indication that the second user wishes to respond to the listing. Other embodiments are possible as well.

At operation 226, the online marketplace 102 receives an offer for the transaction offering from the second user. Additionally, in some embodiments, the online marketplace 102 receives multiple offers for the transaction offering from multiple users. The online marketplace 102 may include interfaces to receive the offer using various methods. For example, the online marketplace 102 can receive the offer when the second user submits a form or clicks a button on a web page generated by the online marketplace 102. Additionally, the online marketplace 102 can receive the offer from the second user via e-mail, social media, or text messaging. Sometimes, the offer include terms that mirror the terms described in the listing. Alternatively, the offer may include terms that alter at least one of the terms described in the listing. In some embodiments, the online marketplace 102 permits the second user to modify terms in the offer only when the first user has specified that the term is negotiable in the listing.

At operation 228, the online marketplace 102 transmits the offer and the profile of the second user to the first user. The offer can be transmitted to the first user via e-mail, social media, text message, or other messages. In some embodiments, the offer is transmitted to the first user when the user accesses a web page generated by the online marketplace 102. The profile of the second user is similar to the profile of the first user and includes information that the first user can review to determine whether to enter into a transaction with the second user. In at least some embodiments, the profile of the second user is transmitted to the first user with the offer. Alternatively, the profile of the second user is transmitted to the first user separately from the offer, such as in response to the first user following a link in an e-mail, a social media message, or on a web page. Other embodiments are possible as well.

At operation 230, the online marketplace 102 receives an acceptance of the offer from the first user. The online marketplace 102 can receive the acceptance in many different ways in different embodiments. For example, in some embodiments, the acceptance is received when the first user follows a link, submits a form, or clicks a button on a web page generated by the online marketplace 102. Alternatively, the acceptance is received by the online marketplace 102 via e-mail, text message, or social media. Other embodiments are possible as well.

Additionally, rather than receiving an acceptance, the online marketplace 102 can also receive a counter-offer. The counter-offer varies one or more of the terms presented in the offer.

At operation 232, the online marketplace 102 manages payments between the first user and the second user. When the transaction involves the first user selling a transaction offering to the second user, the second user will generally make one or more payments to the first user according to the agreed upon payment terms of the transaction. In at least some embodiments, the online marketplace 102 operates to receive the payments from the second user and transmit the payments to the first user. In this manner, the online marketplace 102 can verify and record that the payments are made according to the agreed upon terms of the transaction. Alternatively, the online marketplace 102 can receive an indication that the payment has been made and received. For example, in some embodiments, the second user makes payments to the first user using the PayPal® payment service from eBay® of San Jose, California. Additionally, various embodiments operate to receive or transmit payments through intermediary payment services or technologies such as Facebook Messenger from Facebook, Inc. of Menlo Park, California; WhatsApp from WhatsApp Inc., of Mountain View, California; Twitter from Twitter, Inc. of San Francisco, California; SMS; e-mail; and other payment services or technologies. In some embodiments, users use one or more payment services or technologies to make payments to another user via the online marketplace 102 (e.g., the payment is first received by the online marketplace 102 and then the online marketplace 102 makes a payment to the other user) or directly.

At operation 234, the online marketplace 102 updates the profiles of the first user and second user. The profiles are updated based on whether the first user and the second user perform according to the terms of the agreed upon transaction. The profiles may be updated based on a review of the other user in the transaction. For example, the first user can provide a review of the second user and the second user can provide a review of the first user. The reviews can be textual, numeric ratings (e.g., a score of 0-100), or both. In at least some embodiments, the online marketplace 102 operates to allow the first user and the second user to enter or update the review while the transaction is active. The profiles are also updated based on whether the payments were properly made during operation 232. In at least some embodiments, the online marketplace 102 updates the profiles of both the first user and the second user with a transaction coin to indicate that a transaction was successfully completed. If the transaction was not completed successfully, the online marketplace 102 updates the profiles of at least one of the first user and the second user with a tarnished transaction coin.

Figure 4:
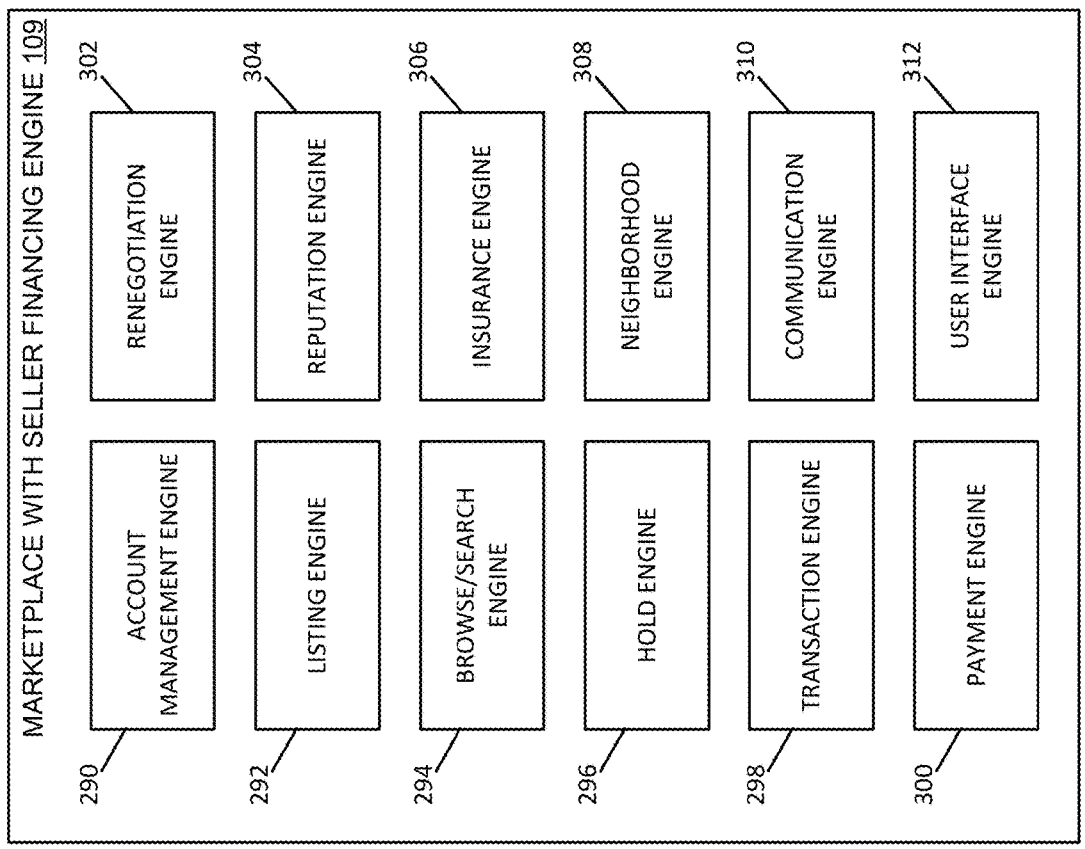
FIG. 4 illustrates an exemplary architecture of the program modules of the server of FIG. 1.

FIG. 4 illustrates an exemplary architecture of the marketplace with seller financing engine 109 of the server 108. The marketplace with seller financing engine 109 includes one or more modules that, when executed by the processing device 120 (shown in FIG. 2), perform one or more operations of the server 108. The engines include an account management engine 290, a listing engine 292, a browse/search engine 294, a hold engine 296, a transaction engine 298, a payment engine 300, a renegotiation engine 302, a reputation engine 304, an insurance engine 306, a neighborhood engine 308, a communication engine 310, and a user interface engine 312. At least some embodiments include more, fewer, or different engines than those shown in FIG. 4.

The account management engine 290 operates to manage accounts for users of the online marketplace 102. In at least some embodiments, the account management engine 290 allows an individual or entity to register as a user of the online marketplace 102 and to log in and out of the online marketplace 102. In at least some embodiments, the account management engine 290 operates to associate an account with one or more social medial accounts so that the online marketplace 102 can do one or more of allowing the user to login using the social media account and posting to the social media account on behalf of the user. In some embodiments the account management engine operates to perform user verification and award one of a plurality of user verification levels to the users depending on the completion of one of a plurality of verification processes, as discussed in further detail herein.

The listing engine 292 operates to receive, store, and update listings for transaction offerings. The browse/search engine 294 operates to browse and search the listings in the online marketplace 102. The hold engine 296 operates to hold a transaction offering available in the online marketplace 102 based on hold terms specified in the listing.

The transaction engine 298 operates to manage the negotiation of transactions in the online marketplace 102, including offers and counter-offers and the agreement to the terms of a transaction. Although the transactions often involve payments, in at least some embodiments, a user may elect to donate a transaction offering to the online marketplace 102 or to another user. In these embodiments, the receiving user may need to accept the transaction offering to complete the transaction.

The payment engine 300 operates to manage the payments between users according to an agreed upon transaction. In some embodiments the payment engine 300 operates to monitor compliance with the terms of the seller-financed transactions including receipt of payments over time from the buyer. Additionally, in some embodiments the payment engine 300 operates to manage the payments, which can include sending out periodic bills or reminders to buyers, notifying buyers and sellers if a payment is coming due, notifying buyers and sellers if a payment is past due, and the like. In some embodiments the payment engine 300 utilizes predefined payment methods to automatically deduct a payment from a payment account of the buyer to make payments or when a payment is past due. In some embodiments the payment engine imposes penalties on the buyer if payments are not made on time, such as by charging a late fee, increasing an interest rate for the transaction, locking the buyers account to prevent further transactions in the online marketplace, and the like. In some embodiments the payment engine 300 informs the reputation engine 304 of conformance (including non-conformance) to the terms of the transaction, and the reputation engine updates the user's reputation data (including the trust score) accordingly, as discussed in further detail herein. Accordingly, in some embodiments the payment engine 300 automatically manages the transaction for both the buyer and the seller. For example, in some embodiments the seller does not have to send reminders or late notices, and does not have to contact, beg, threaten, or take other enforcement actions against the buyer in order to obtain conformance with the terms of the agreement. Additionally, in some embodiments the buyer is assisted in following the terms of the agreement by receiving bills or reminders, or by having the payments automatically made on behalf of the buyer.

Further in some embodiments, the payment engine 300 operates to send various compliance notices related to transactions. The compliance notices may be required by laws or regulations applicable to the buyer or seller or by policies of the online marketplace 102. Examples of the compliance notices include collection notices, late payment notices, eviction notices, scam notices, illegal activity notices, etc. These compliance notices may be sent to either buyers or sellers as appropriate in the circumstances. Further, these compliance notices may be partially or fully prepopulated with the information required by the applicable laws, regulations, or policies.

The renegotiation engine 302 operates to allow users to propose and accept adjustments to the terms of a transaction.

The reputation engine 304 operates to manage reputation data for users, including information relating to reputations of users in the online marketplace system and the performance of that user in past transactions. In some embodiments, the reputation engine 304 generates a user trust profile. The trust profile contains reputation data and is configured to allow the both buyers and sellers to evaluate trustworthiness of each other prior to entering into seller-financed transactions. Reputation data includes, for example, reputational factor data, described in further detail herein. In some embodiments the trust profiles include trust scores. The trust scores are also used by parties to evaluate the trustworthiness of the other party. Some embodiments of the reputation engine 304 generate additional scores for various purposes. For example, some embodiments allow users to schedule meetings (e.g., in person, by phone or videoconference, etc.) and the reputation engine 304 may generate a meeting accountability score based on feedback from users about whether a particular user attended a scheduled meeting in a timely manner. In some embodiments, users may leave feedback about meeting attendance for a particular user regardless of whether they actually enter a transaction with the user.

The insurance engine 306 operates to allow users to obtain insurance that to cover transactions the user enters using the online marketplace 102. The insurance may provide assurance to the seller that payments will be made. Obtaining insurance is just one example of providing payment assurance. Some embodiments include other techniques for providing payment assurance to users as well. In some embodiments, either the buyer or seller (or both) may be able to purchase (or otherwise secure) payment assurance for a transaction.

The neighborhood engine 308 operates to manage the neighborhood of users of the online marketplace, including adding users to each other's neighborhoods, soliciting users in neighborhoods, and filtering listings to those in a neighborhood. Additionally, some embodiments of the neighborhood engine 308 allow users to send neighborhood invitations to other users or potential users through various social media tools.

The communication engine 310 operates to communicate with users of the online marketplace and to allow users to communicate with each other. The user interface engine 312 operates to generate a user interface to access the online marketplace. In at least some embodiments, the user interface comprises a plurality of interconnected web pages or a graphical user interface in an application. Other embodiments are possible as well.

Figure 5:
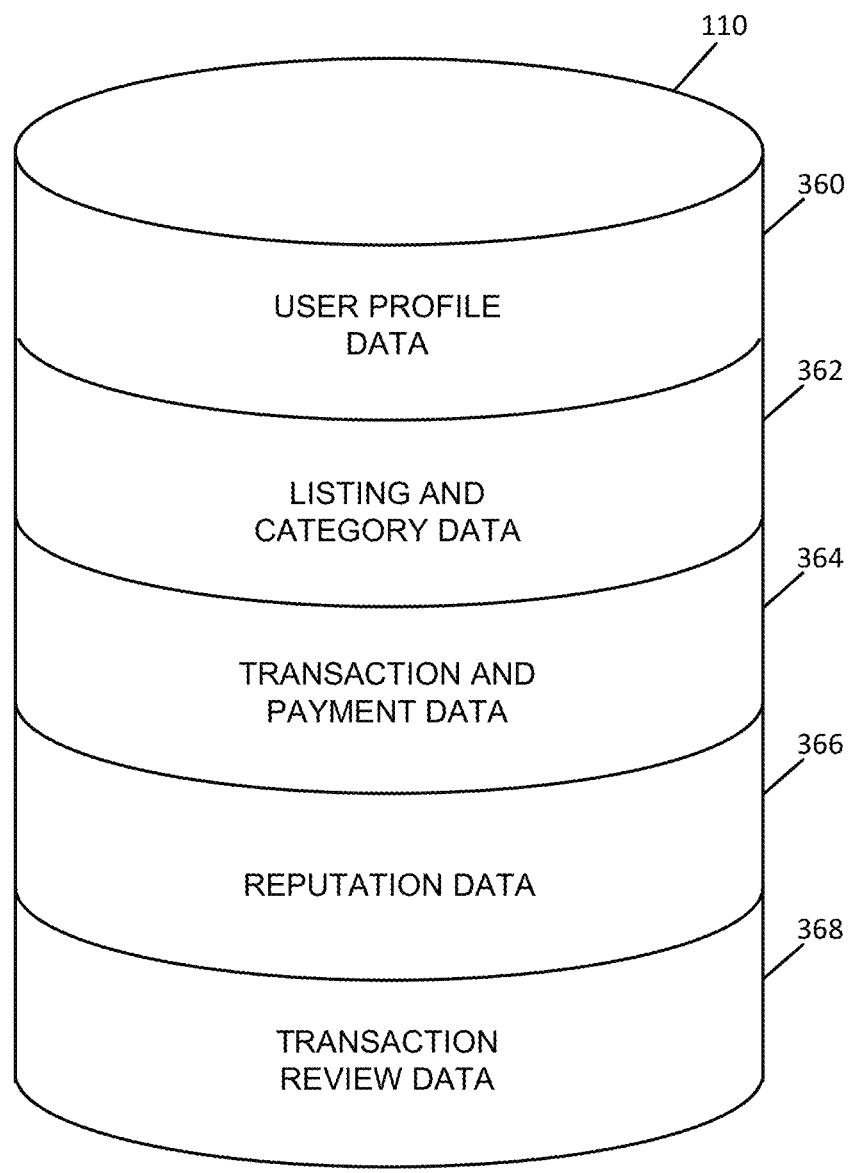
FIG. 5 illustrates an exemplary architecture of the database of FIG. 1.

FIG. 5 illustrates an exemplary architecture of the database 110. In at least some embodiments, the database 110 stores user profile data 360, listing and category data 362, transaction and payment data 364, reputation data 366, and transaction review data 368.

The user profile data 360 includes one or more tables containing data about the users of the online marketplace 102. For example, the user profile data 360 can include contact information and bank account or payment option information for users.

The listing and category data 362 includes one or more tables containing data about the categories and listings of transaction offerings on the online marketplace 102. In at least some embodiments, the categories are organized hierarchically and the listings are associated with at least one category.

The transaction and payment data 364 includes data related to transactions that have been agreed to using the online marketplace 102. The transaction and payment data 364 can also include historical information about payments that have been made and upcoming payments that are coming due for a transaction.

The reputation data 366 includes information relating to the reputations of users and the performance of transactions by users. In some embodiments, the reputation data 366 includes reputational factor data and trust score data. For example, the reputational factor data can include a rating of a transaction for a user that is entered by the other party to the transaction. Additionally, the reputational factor data can include information that is automatically generated by the online marketplace 102 based on whether the user has made payments or delivered the transaction offerings consistent with the terms of the agreed upon transaction. Additionally, the reputational factor data can include information about the verification level of the user. In at least some embodiments, the trust score data includes a single score that represents an overall trust score for a user that is based on some or all of the reputational factor data for that user.

The transaction review data 368 includes information provided by one user that reviews the performance of another user. The transaction review data 368 can include textual descriptions of a transaction and users performance of the transaction. In some embodiments, the transaction review data 368 includes various standard descriptions of a transaction such as "service provided as described," "product damaged," "all payments made on time," or "one or more late payments."

Figure 6:
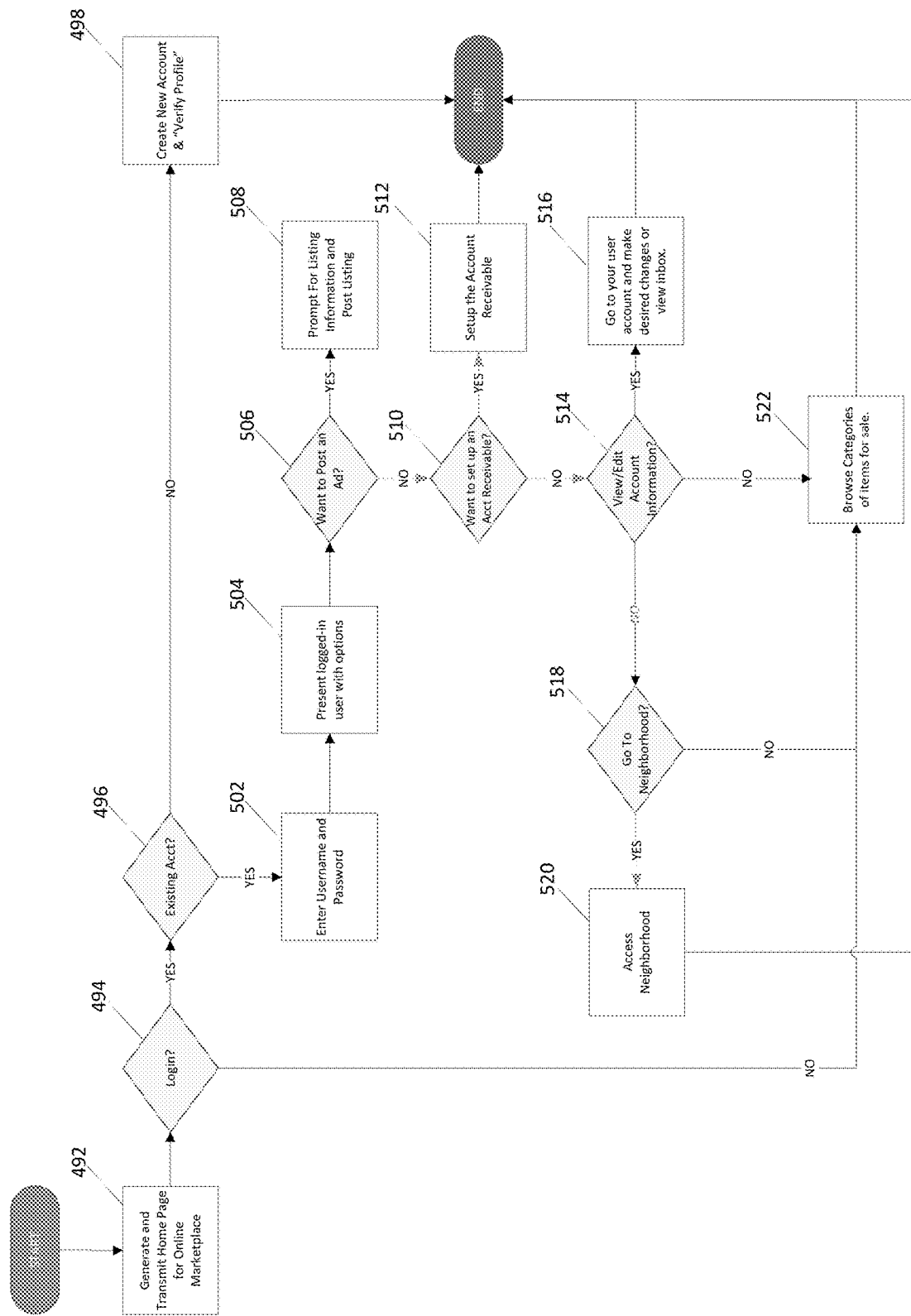
FIG. 6 is a flow chart illustrating an example method of generating a user interface for the online marketplace of FIG. 1.

FIG. 6 is a flow chart illustrating an example method 490 of generating a user interface for the online marketplace 102 using the system 100. In some embodiments, at least some operations of the method 490 are performed by the user interface engine 312 using a processor (such as processing device 120, shown in FIG. 2). In this example, the method 490 includes operations 492, 494, 496, 498, 502, 504, 506, 508, 510, 512, 514, 516, 518, 520, and 522.

At operation 492, the user interface engine 312 generates and transmits a home page to a user. The home page may be transmitted over the network 106 to the user computing devices 104. In some embodiments, the home page includes images and textual descriptions of at least some of the transaction offerings available using the online marketplace 102. Other embodiments include additional information on the home page.

At operation 494, it is determined whether the user wishes to login. In at least some embodiments, the user interface engine 312 determines that a user wishes to login based on the user following a link on the home page. Alternatively, the user interface engine 312 prompts the user to ask whether the user wishes to login. If the user does wish to login, the method proceeds to operation 496. If the user does not wish to login, the method proceeds to operation 522.

At operation 496, it is determined whether the user has an existing account. If the user does not have an existing account, the method proceeds to operation 498. At operation 498, the user is prompted to create a new account and verify profile information. Example methods of creating user accounts are described in more detail below. However, if the user does have an existing account, the method proceeds to operation 502.

At operation 502, the user may enter login information (e.g., a user name, e-mail address, and password). In at least some embodiments, the user enters the login information directly on the home page or any other page. Additionally, the user can enter login information on a separate login page that may be accessed by following a link on the home page or any other page. In at least some embodiments, the user enters login information in a pop-up window that maintains contextual information about the user's interaction with the online marketplace 102 (e.g., which transaction offering the user is viewing, etc.). Additionally, in some embodiments, the user enters login information as part of the process of making an offer for a transaction offering. In some embodiments, the online marketplace 102 transmits a cookie to the user that can be stored by the user's computing device and is used in future communication with the online marketplace 102 to identify the user. The cookie may be used to allow a user to remain logged-in for a certain time period without entering login information. Additionally, in some embodiments, the user is automatically logged-in based if the user is logged-in to a social media account associated with the user's account. Other embodiments are possible as well. In at least some embodiments, once the user logs-in to the online marketplace 102, the username and some information about the user is shown, such as the user's trust score, number of transaction coins earned, profile verification status, rating, and the length of time the user has had an account with the online marketplace 102.

At operation 504, the user is presented with a variety of options after successfully logging in. In some embodiments, the options include buying, selling, or browsing through transaction offerings; setting up an account receivable payment plan for an existing debt; viewing and communicating with other users in the user's neighborhood; and modifying account settings.

At operation 506, it is determined whether the user wants to list a transaction offering for sale. If so, the method proceeds to operation 508, where the listing is posted. Method for posting listings are described in more detail below. If not, the method proceeds to operation 510.

At operation 510, it is determined whether the user wants to setup an account receivable. If the user wishes to setup an account receivable, the method proceeds to operation 512, where the account receivable is setup. In at least some embodiments, the account receivable is based on a pre-existing debt. For example, the account receivable can be based on fees incurred for professional services (e.g., legal or accounting fees). In at least some embodiments, a first party enters payment terms for the account receivable and sends the terms to a second party. The terms may be sent to an inbox maintained by the online marketplace 102 that is associated with the second party. Additionally, the terms may be sent via e-mail, text messaging, social media, voice communication, postal mail, or other external methods as well. The second party can then accept the proposal and complete the payments to the first party using at least some of the tools of the system 100, such as the payment engine 300. Alternatively, the second party can pre-approve proposals from the first party if the first party is trusted (e.g., a professional services provider). Beneficially, the system 100 can alleviate the tension and administrative overhead associated with collecting debts.

Additionally, in some embodiments, an account receivable is automatically created based upon a transaction being completed at an external location (i.e., external to the marketplace), such as on a separate site (e.g., an e-commerce website) or in a brick-and-mortar store. For example, an e-commerce website (or other external location) could offer a seller-financed payment option using the system 100. The payment option could require that fifty percent of the purchase price be paid at the time of the purchase, and the remainder be paid in six monthly payments with five percent interest. Then, whenever a visitor to the e-commerce website chose the seller-financed payment option, an account receivable would automatically be setup in the system 100 between the operator of the e-commerce web site and the purchaser. In at least some embodiments, the operator of the e-commerce website may choose to review (e.g., look at the potential purchaser's trust score) all potential purchases made using seller financing before entering into the transaction. Alternatively, the operator of the e-commerce site can define criteria for automatically approving potential purchasers such as a minimum trust score and number of completed transactions. Alternatively or additionally, the visitor could use the system 100 to make an offer and negotiate with the operator of the external location. Additionally, in some embodiments, after the transaction is processed using the system 100, it may be transferred back to the external location for further completion (e.g., product/service delivery, order fulfilment, etc.). In at least some embodiments, a confirmation is sent to the external location that the transaction is complete or that a binding contract has been negotiated. Similarly, other external locations can also offer seller-finances payment options using the system 100. For example, a point-of-sale (POS) system in a brick-and-mortar store that offers seller-financed transactions can create an account receivable in the system 100 upon completion of the transaction at the POS.

If the user does not want to setup an account receivable, the method continues to operation 514. At operation 514, it is determined whether the user wants to view or edit account information. If the user does want to edit or view account information, the method proceeds to operation 516. At operation 516, the user can update various account information using the account management engine 290. The various information that is stored in a user account is described in greater detail below. In some embodiments, the user can access an inbox containing messages from other users while viewing the account information.

If the user does not want to view or edit account information, the method continues to operation 518. At operation 518, it is determined whether the user wants to access the neighborhood. If the user does want to access the neighborhood, the method proceeds to operation 520, where the user accesses the neighborhood. Within the neighborhood, a user can solicit neighbors to enter into transactions, make payments, or otherwise use the system 100. A user can also invite users and non-users alike to join the user's neighborhood. In some embodiments, if a non-user accepts the invitation to join the user's neighborhood and registers with the online marketplace 102, the online marketplace 102 awards an incentive (e.g., a voucher for paying fees or making purchases) to the user. The neighborhood is described in more detail below. If the user does not want to access the neighborhood, the method proceeds to operation 522.

At operation 522, the user interface engine 312 generates a user interface for browsing or searching transaction offerings. In at least some embodiments, the user interface includes a list of top-level categories. Additionally, the list can include the number of transaction offerings available in each of the top-level categories. The user interface can also include more detailed categories and various search and filtering capabilities. The search and browse functionality is described in more detail below. In at least some embodiments, the search and browse capability can be accessed by users that are logged in and that are not logged in.

Figure 7:
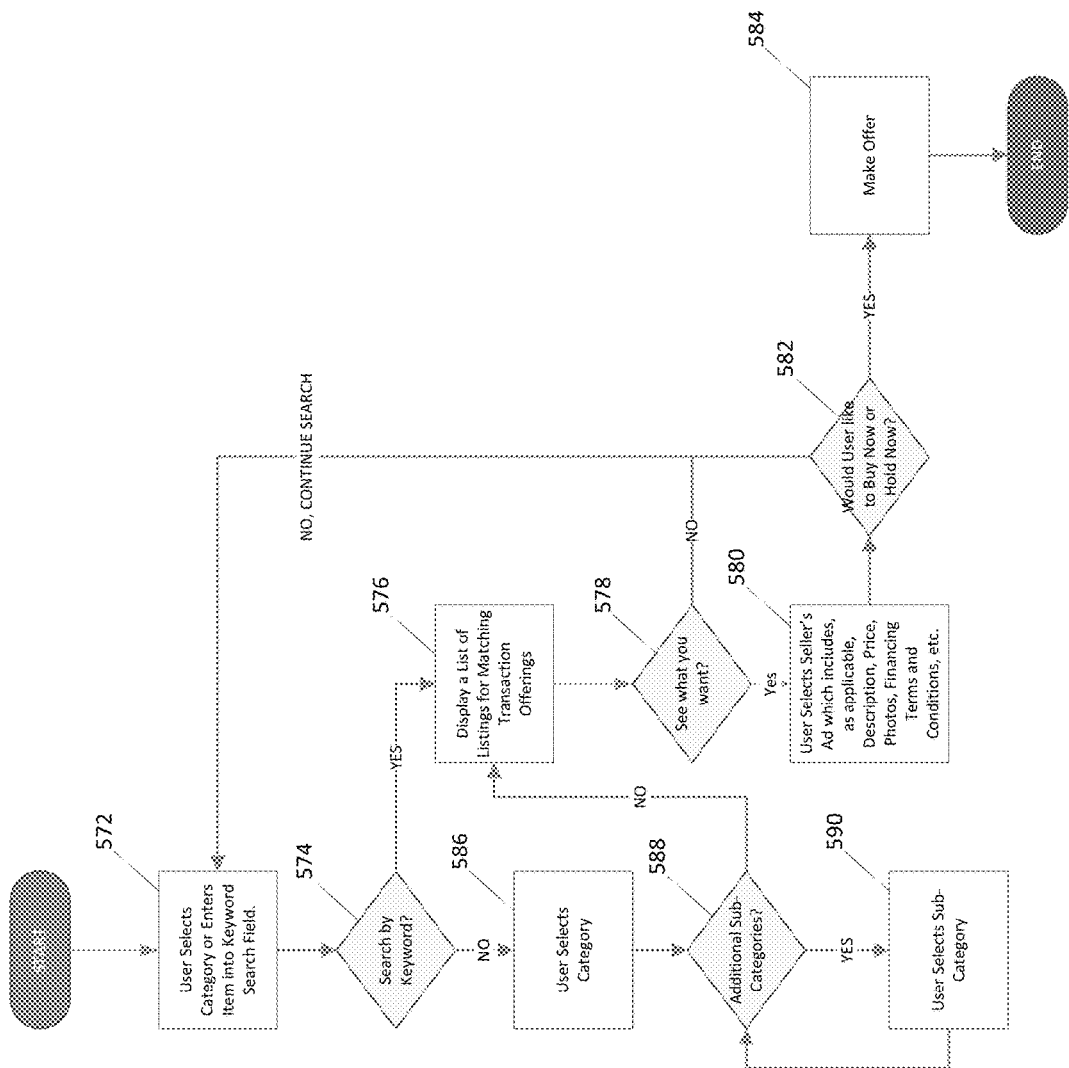
FIG. 7 is a flow chart illustrating an example method of browsing and searching listings using the system of FIG. 1.

FIG. 7 is a flow chart illustrating an example method 570 of browsing and searching listings using the system 100. In some embodiments, at least some operations of the method 570 are performed by the browse/search engine 294 using a processor (such as processing device 120, shown in FIG. 2). In this example, the method 570 includes operations 572, 574, 576, 578, 580, 582, 584, 586, 588, and 590.

The method 570 operates to present a user interface for users to locate transaction offerings that they are interested in. The transaction offerings can be located by searching or browsing. In at least some embodiments, anyone who access the online marketplace 102 can browse or search for listings. However, typically, a user will need to log in to the system 100 in order to make an offer for a transaction offering.

The listings for transaction offerings can be categorized. The categories may be organized hierarchically, having top-level categories that are subdivided into sub-categories. The sub-categories may be further subdivided into successively more specific sub-categories as is necessary and useful to help users locate transaction offerings. As an example, in at least some embodiments, the top level categories include "Real Estate," "Businesses," "Jewelry," "Tickets," "Electronics," "Designer Clothes," "Vehicles," "Services," "Vacations," "Animals/Pets," "Hardware Store," "Grocery Store," and "Wanted." The top-level category "Real Estate" is subdivided into the subcategories "Single Family Home," "Parking Stalls," and "Rentals." The subcategory "Rentals" can be further subdivided into the subcategories "Residential," and "Commercial." Some embodiments allow further subdivision.

At operation 572, the user selects a category or enters a term into a search field. At operation 574, it is determined whether the user entered a term into the search field. If yes, the method 570 proceeds to operation 576. If no, the method 570 proceeds to operation 586.

At operation 576, a list of listings of transaction offerings that matches the search terms is displayed. The list may be presented in various ways. In at least some embodiments, the list is sorted based on when the listing was posted. Additionally, the user interface includes controls to sort the list according to various criteria such as price, trust score of the user who listed the transaction offering, and various payment terms. Other embodiments allow the list to be sorted by additional criteria as well. The user interface may divide the list into multiple pages, showing only a portion of the matching listings on each page. Further, the user interface may show only a summary or preview of each matching listing.

At operation 578, it is determined whether the list includes one or more transaction offerings that the user is interested in. If so, the method proceeds to operation 580. If not, the method returns to operation 572, where the user may resume browsing categories or entering search terms.

At operation 580, additional information is displayed for the one or more transaction offerings that the user is interested in. Examples of additional information include a detailed description, payment terms, including seller-financing terms, photos, etc. In at least some embodiments, the additional information also includes the number of users who have viewed the listing and the number of offers made for the transaction offering in the listing. Other embodiments may include different additional information that is displayed when a user indicates that an item in the list may be of interest.

At operation 582, it is determined whether the user would like to buy the transaction offering or hold the transaction offering. If so, the method proceeds to operation 584, where the user may make an offer for the transaction offering. Making an offer is described in more detail below.

At operation 586, the user selects a category of interest. At operation 588, it is determined whether the user would like to select a subcategory. If the user would like to select a subcategory, the method continues to operation 590, where the user may select a subcategory. The method then returns to operation 588, where it is again determined whether the user would like to select a subcategory. This continues until the user has selected subcategories to a sufficiently detailed level. When it is determined that the user does not wish to select another subcategory, the method proceeds to operation 576. In at least some embodiments, the categories and subcategories are based on the Standard Industrial Classification (SIC) or the North American Industry Classification System (NAICS). For example, the categories may span a broad range of SIC or NAICS classifications including multiple divisions or major groups. In some embodiments, the wherein the listings of transaction offerings include transaction offerings across a plurality of different product categories, wherein the product categories are selected from multiple divisions or major groups as defined in the 1987 version of the SIC manual or from multiple sectors as defined in the official 2012 NAICS manual.

Additionally, in at least some embodiments, the browse and search functionality are integrated into a single interface. In this manner, a user may browse by category the listings that match a particular search term. Similarly, the user may search within the listings in a particular category. Additionally, the interface may allow the user to post a want ad listing describing an item the user wants if searching and browsing does not successfully identify the item.

Figure 8:
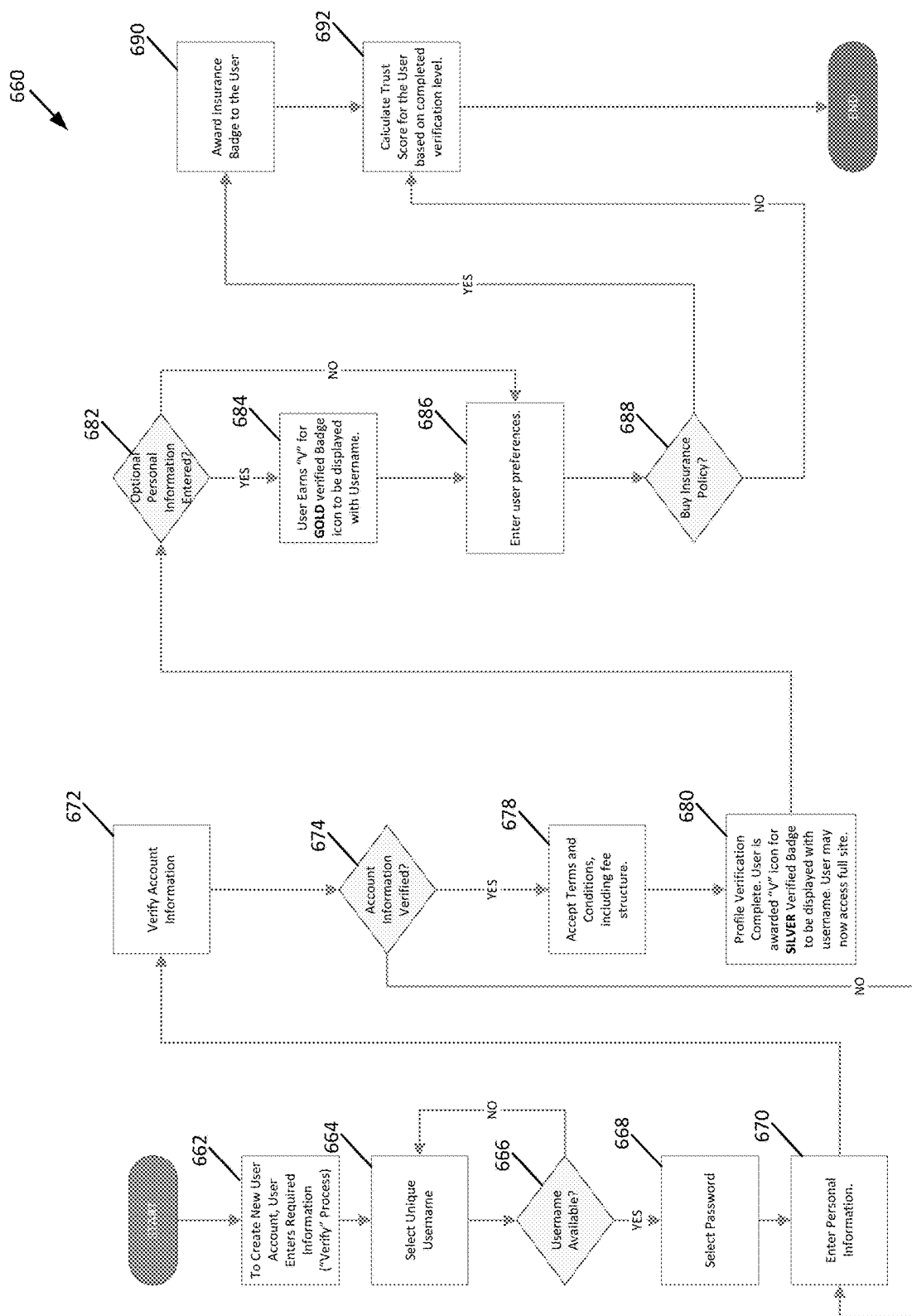
FIG. 8 is a flow chart illustrating an example method of creating a user account using the system of FIG. 1.

FIG. 8 is a flow chart illustrating an example method 660 of creating a user account using the system 100. In some embodiments, at least some operations of the method 660 are performed by the account management engine 290 using a processor (such as processing device 120, shown in FIG. 2). In this example, the method 660 includes operations 662, 664, 666, 668, 670, 672, 674, 676, 678, 680, 682, 684, 686, 688, 690, and 692.

At operation 662, the user indicates that he or she wishes to create a new user account. Accounts can be associated with individuals or business entities. In at least some embodiments, accounts that are associated with business entities are also associated with an individual.

At operation 664, a unique username is selected. The user may select a user name by typing in a user name. Alternatively, the account management engine 290 may suggest one or more candidate user names. In at least some embodiments, an e-mail address is used as the unique user name.

At operation 666, it is determined whether the candidate user name entered at operation 664 is unique. In some embodiments, the uniqueness of the user name is verified by querying a user table in a database for user names that are identical to the candidate user name. If the user table already contains a user name that matches the candidate user name, it is determined that the user name is not unique. If the user name is not unique, the method 660 returns to operation 664.

At operation 668, the user enters a password. In at least some embodiments, the password must be entered twice and must match. In this manner, it is less likely that a typographical error will result in the password being set incorrectly. Additionally, the password can be subject to various security requirements, such as a minimum length and the inclusion of certain types of character (e.g., number, symbol, lower case, upper case, etc.).

At operation 670, personal information is entered by the user and received by the account management engine 290 to start the verify profile process. In at least some embodiments, there is both required personal information and optional personal information. Examples of required personal information include e-mail address, full name (e.g., first name, middle name or middle initial if applicable, and last name), date of birth, last four digits of social security number for individuals, federal tax identification number for business entities, gender, home address, phone number, bank account name, bank account number, and bank account routing number. In at least some embodiments, there are more, fewer, or different types of required personal information. Examples of optional personal information include shipping address (if different than home address), driver's license number of state identification number, employer name, work address, school history, photograph, alternate phone number, emergency contact, links to social media accounts (e.g., Facebook, Twitter, LinkedIn, Google+, Instagram, etc.), information (e.g., login information) to access and post to social media accounts, credit or debit card numbers, and personal narrative. In at least some embodiments, there are more, fewer, or different types of optional personal information. Additionally, in at least some embodiments, some of the examples of optional personal information may be required and some of the examples of required personal information may be optional.

The personal information the is entered can be protected and subject to various privacy policies. For example, the personal information may be protected and only shared after the parties have entered into a transaction. In that case, only the personal information required to complete the transaction (e.g., name and address) is shared between the parties.

At operation 672, the account information is verified. In at least some embodiments, one or more of the e-mail address, mailing address, phone number, and bank account information are verified. The e-mail address can be verified by sending an e-mail message that contains a verification link to the e-mail address. The mailing address can be verified by sending a physical letter that includes a verification code. The phone number can be verified by sending a text or voice message that includes a verification code to be entered. The bank account can be verified by making a small deposit or withdrawal. Alternatively, the personal information can be verified using different techniques. In at least some other embodiments, more, fewer or different personal information is verified. In at least some embodiments, the verification of personal information is repeated one or more times if the personal information is not successfully verified initially.

At operation 674, it is determined whether the personal information was successfully verified. If the personal information was successfully verified, the method 660 continues to operation 678. If not, the method 660 returns to operation 670, where the user can check or update the personal information. In at least some embodiments, the user is sent an e-mail to indicate that the personal information needs to be reviewed. Alternatively, an error message is displayed for the user after login if the personal information needs to be reviewed.

At operation 678, the user is prompted to review and accept the terms and conditions and fee structure. At operation 680, the user is awarded a verification badge (e.g., a Silver Verified Badge) that indicates the user has completed the verification process. The verification badge can be displayed as an icon next to the user's username and on the user's profile page. Other embodiments include other methods to indicate that the user has completed the verification process. Additionally, in at least some embodiments, the user is granted full access to the site after being verified (e.g., the user can post listings, the user can make offers, etc.). Awarding a Silver Verified Badge is one example method of indicating that the user has completed the verification process. In other embodiments, different methods are used to indicate that the user has completed the verification process.

At operation 682, it is determined whether the user entered various optional personal information. In at least some embodiments, one or more elements of the optional personal information is verified using various methods. If the user has entered the optional personal information, the method 660 proceeds to operation 684, where the user is awarded an additional verification badge (e.g., a Gold Verified Badge) that indicates that the user has completed the optional verification process. Like the Silver Verified Badge, the Gold Verified Badge can be displayed next to the user's username and on the user's profile page. Awarding a Gold Verified Badge is one example method of indicating that the user has completed an optional verification process. In other embodiments, different methods are used to indicate that the user has completed an optional verification process. Additionally, in at least some embodiments, additional verification processes are included that award additional badges or other indicia of completion.

At operation 686, the user can configure preferences. Examples of preferences include whether the default behavior should be to browse regional, national, or international listings; a default time zone; a preferred currency; and a preferred offer communication method (e.g., e-mail, text, social media, etc.). Other embodiments include more, fewer, or different preferences.

At operation 688, the user is prompted to buy a profile insurance policy. Some embodiments provide an opportunity to purchase other forms of payment assurance as well. In some embodiments, payment assurance is provided by a policy purchased from the online marketplace 102. In other embodiments, payments assurance is provided by an insurance policy provided by a third party. The insurance policy covers the transaction the user enters up to a predetermined coverage amount. The price of the insurance is based on the user's trust score and the coverage amount. Additionally, in some embodiments, the price of the insurance is based on additional factors such as a credit score (e.g., a FICO score) for the user (or for the other user). In some embodiments, the user may provide the credit score. Additionally, in some embodiments, the credit score is verified by, for example, a credit bureau. The insurance covers all transactions until the cumulative transaction amount is greater than the predetermined coverage amount. Alternatively, the insurance covers all transactions that are individually below the predetermined coverage amount. Additionally, additional insurance can be purchased for individual transactions as well. Other embodiments are possible.

If the user does purchase insurance, the method 660 proceeds to operation 690. At operation 690, the user is awarded an insurance badge. The insurance badge can be displayed next to the user's username and on the user's profile page. The presence of the insurance badge can provide peace of mind to the other party as the insurance will cover nonperformance of the transaction. In this manner, a user may increase the likelihood of completing a transaction by purchasing insurance.

At operation 692, the user's trust score is calculated at least in part based on the verification level completed. The process of calculating a trust score is described in more detail below.

Figure 9:
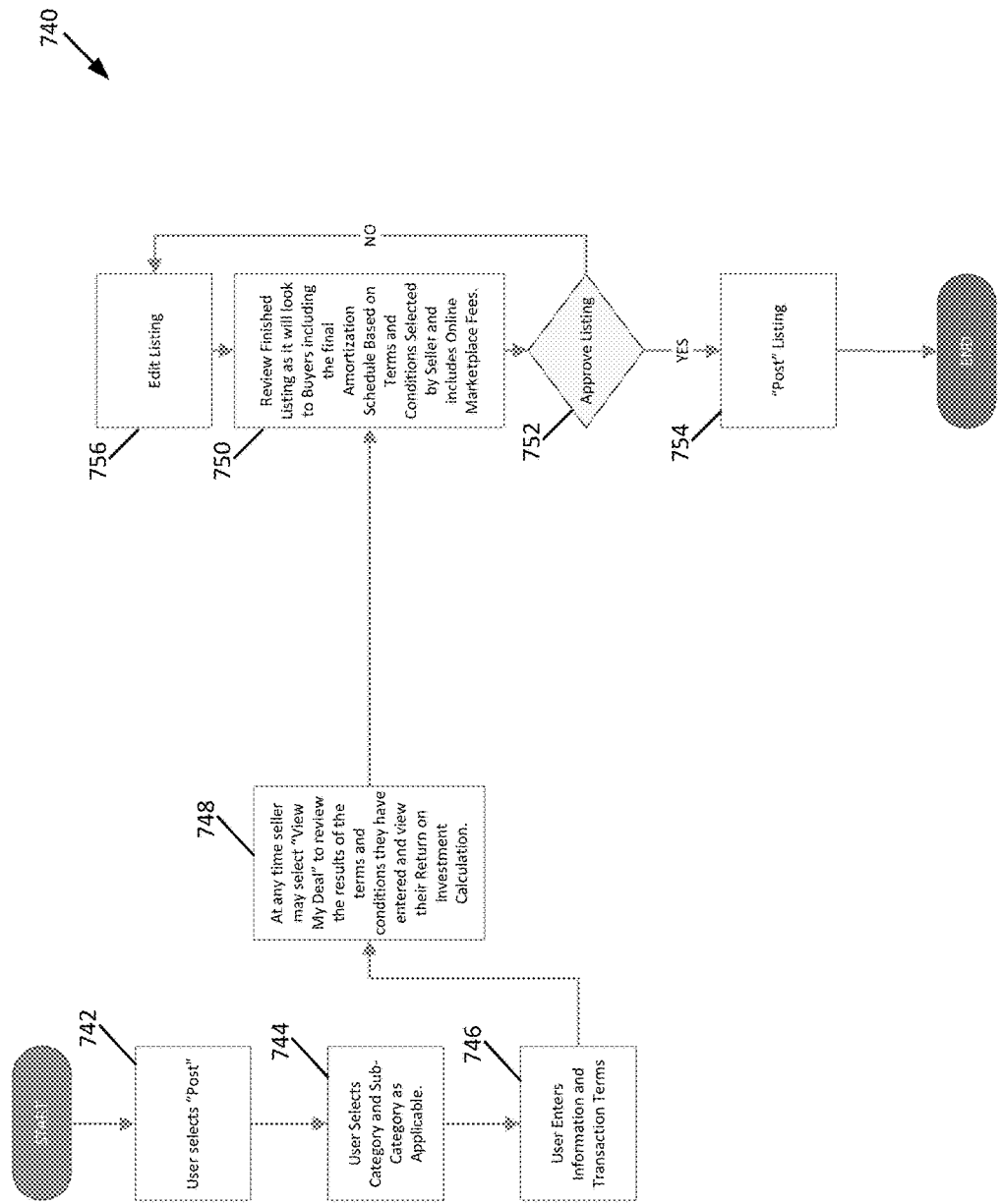
FIG. 9 is a flow chart illustrating an example method of creating a listing on the online marketplace of FIG. 1 for a transaction offering.

FIG. 9 is a flow chart illustrating an example method 740 of creating a listing on the online marketplace 102 for a transaction offering. In some embodiments, at least some operations of the method 740 are performed by the listing engine 292 using a processor (such as processing device 120, shown in FIG. 2). In this example, the method 740 includes operations 742, 744, 746,748, 750, 752, 754, and 756.

At operation 742, a user selects "post" to start the process of generating and posting a listing for a transaction offering. The user can select post by following a link on the home page. Alternatively, the user can select post by following links on other pages or activating a button or other user interface element in a user interface generated by an application. Other embodiments are possible as well.

At operation 744, the user selects a category and one or more subcategories to describe that are appropriate for the transaction offering. In at least some embodiments, the user selects the categories and subcategories from a hierarchical list displayed on a user interface. In at least some embodiments, the user interface initially hides subcategories until a top-level category has been selected. Then the appropriate sub-categories are displayed in the list. Additionally, in at least some embodiments, the user may select multiple categories that are appropriate to describe the transaction offering. Other embodiments are possible as well.

At operation 746, the user enters information about the transaction offering. Depending on the type of transaction offering various types of information may be required or option. Examples of required information include title, description, and location. Example of required transaction terms include price, down payment amount, interest rate, number of payments, payment frequency, date of first payment, delivery option (e.g., ship, pick up, third-party delivery, etc.), and whether layaway is available. Examples of optional information include photos. Examples of optional transaction terms include a hold amount and time period, whether multiple or adjustable interested rates are applied, a balloon payment amount, whether auto-pay is required, a prepayment penalty amount, whether the transaction offering is being provided "AS/IS," whether a warranty is included and the terms of that warranty, whether insurance (or another form of payment assurance) is required, and whether there is an expiration date (e.g., for a service being purchased). Additionally, in some embodiments, the user can specify whether a counter-offer will be considered for each of the terms. In this manner, the user can indicate to users who review the listing whether certain terms are negotiable. Beneficially, this may facilitate reaching an agreement on a transaction by focusing the negotiation on points where the parties are flexible and avoiding offers that will not be considered by the user who posts the listing. In other embodiments, there are more, fewer, or different optional and required terms.

The hold amount is a non-refundable amount that a user can pay to hold a transaction offering for the specified hold time period. During the hold time period the user who posted the listing will not enter into a transaction with another user. If the user who paid the hold amount chooses to complete the transaction, the hold amount will be applied towards the transaction. If the user does not, the user who posted the listing retains the amount paid as compensation for holding the transaction offering. In at least some embodiments, the hold time period is forty-eight hours. Other embodiments are possible.

At operation 748, a user interface is presented that displays the terms of the proposed listing. Additionally, the user interface displays at least one of the projected cash flow and the return on investment based on the terms of the proposed listing. The user can view this interface before the listing is posted. Additionally, the user can view this interface after the listing is posted and when a counter offer is received. Additionally, in at least some embodiments, the interface displays a comparison of the terms proposed in the listing and the terms in one or more of the offers.

At operation 750, the user can review the finished listing. A user interface that includes the listing as it will be presented to users browse through the online marketplace can be generated. In at least some embodiments, the user interface also includes amortization schedule that is calculated based on the transaction terms specified by the buyer. Further, in at least some embodiments, the amortization schedule is calculated after accounting for any fees charged by the online marketplace 102.

At operation 752, it is determined whether the user approves of the listing. If the user does approve the listing, the method 740 proceeds to operation 754, where the listing is posted and becomes viewable by other users. If the listing is not approved, the method 740 proceeds to operation 756, where the user can edit the listing.

Figure 10:
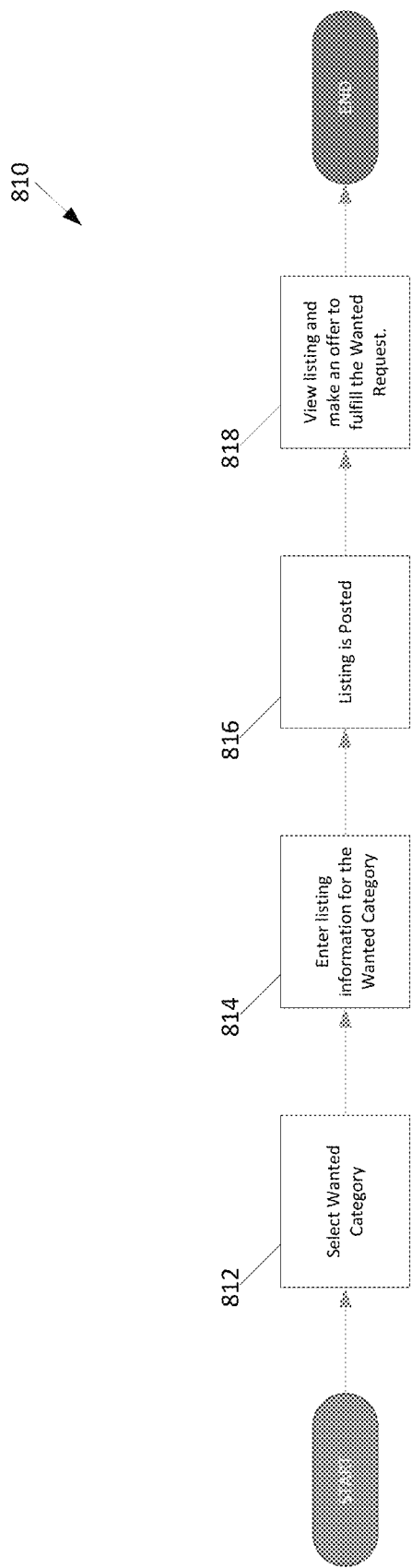
FIG. 10 is a flow chart illustrating another example method of using the wanted category of listings in the system of FIG. 1.

FIG. 10 is a flow chart illustrating another example method 810 of using the wanted category of listings with the system 100. In some embodiments, at least some operations of the method 810 are performed by the listing engine 292 using a processor (such as processing device 120, shown in FIG. 2). In this example, the method 810 includes operations 812, 814, 816, and 818.

At operation 812, the user selects the "Wanted" category. The "Wanted" category can be selected from the home page or while posting an item. Other embodiments are possible as well.

At operation 814, the user can choose to post to the "Wanted" category. The process of posting to the "Wanted" category is similar to the method 740 of posting a listing. However, in at least some embodiments, listings in the "Wanted" category do not require that any of the transaction terms be specified. Further, in at least some embodiments, the user can optionally specify some transaction terms in the "Wanted" listing.

At operation 816, the listing is posted and becomes viewable by others users of the online marketplace 102. At operation 818, another user can review the "Wanted" listing and respond by making an offer to fulfil the "Wanted" request. In at least some embodiments, a user interface is generated that lists at least some of the "Wanted" listings. Beneficially, this user interface permits users to review "Wanted" listings and make offers to supply the "Wanted" listing. Users can earn a profit by providing the transaction offering requested in the listing through the interest that will be received. Additionally, the party that wants the transaction offering can acquire it with financing from a third party, even though financing may not be available in a store.

Figure 11:
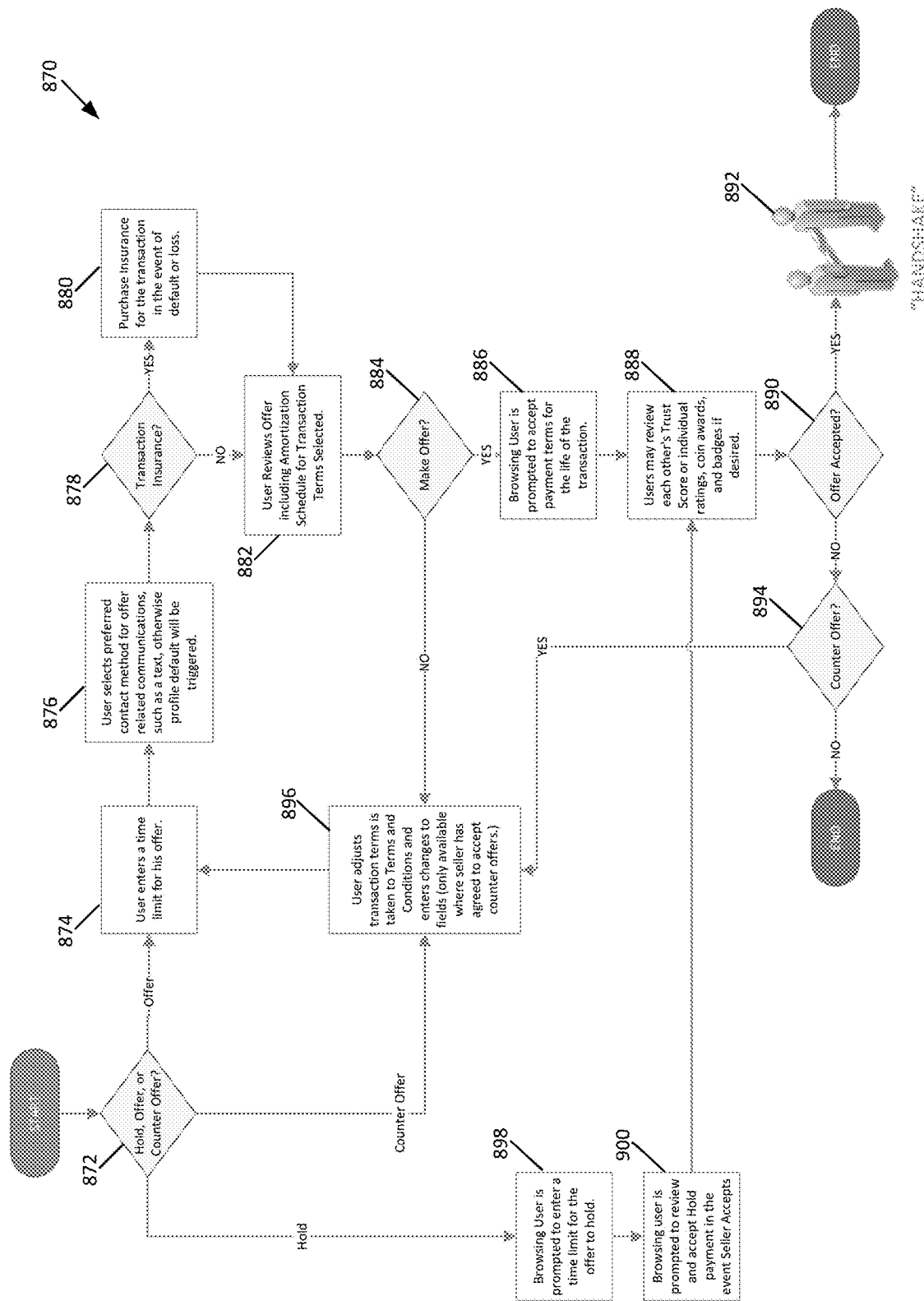
FIG. 11 is a flow chart illustrating an example method of agreeing on a transaction using the system of FIG. 1.

FIG. 11 is a flow chart illustrating an example method 870 of agreeing on a transaction using the system 100. In some embodiments, at least some operations of the method 870 are performed by the hold engine 296 and the transaction engine 298 using a processor (such as processing device 120, shown in FIG. 2). In this example, the method 870 includes operations 872, 874, 876, 878, 880, 882, 884, 886, 888, 890, 892, 894, 896, 898, and 900.

At operation 872, it is determined whether a browsing user wishes to hold, make an offer for, or make a counter offer for a transaction offering posted by a listing user. If the browsing user wishes to make an offer, the method proceeds to operation 874. If the browsing user wishes to make a counter offer, the method proceeds to operation 894. If the browsing user wishes to hold the transaction offering, the method proceeds to operation 898.

At operation 874, the browsing user enters a time limit for the offer. At operation 876, the browsing user selects a preferred method for communication about the offer. If the browsing user does not enter a preferred method, the browsing user's default method of communication is used.

At operation 878, the browsing user is prompted to decide whether to purchase insurance for the transaction. The user interface may display the cost of the insurance and user interface elements that the browsing user can activate to indicate whether to purchase the insurance. If the browsing user chooses to purchase insurance, the method proceeds to operation 880, where the insurance is purchased. Additionally, in at least some embodiments, the browsing user can elect to apply a general insurance policy to the transaction. Additionally, in some embodiments, the browsing user may purchase (or otherwise acquire) another form of payment assurance for the transaction. Similarly, the listing user may elect to acquire a form of payment assurance as well. In at least some embodiments, the price paid to acquire a form of payment assurance (regardless of which user is acquiring it) can be based on one or more of a credit score and a trust score of the browsing user. Additionally or alternatively, in some embodiments, the price paid to acquire a form of payment assurance can be based on other factors.

At operation 882, the browsing user can review the offer, including an amortization schedule based on the transaction terms of the offer. At operation 884, the browsing user decides whether to make the offer. In some embodiments, a user interface is presented that prompts the browsing user to indicate whether the offer should be made. In some embodiments, the user interface may allow either user to indicate that the offer is a "walk away final offer." In this manner, the user may bypass or terminate further negotiations. If the browsing user indicates the offer should be made, the method proceeds to operation 886, where the browsing user is prompted to accept the payment terms in the offer for the life of the transaction. If, instead, the browsing user indicates that the offer should not be made, the method proceeds to operation 894.

After the browsing user has accepted the payment terms, the offer is communicated to the posting user. At operation 888, both the browsing user and the posting user may review one another's profiles, including trust scores, individual ratings, transaction coin awards, and badges.

At operation 890, the posting user decides whether to accept the offer. If the offer is accepted, the method proceeds to operation 892. At operation 892, the browsing user and the posting user are notified that an agreement has been reached. Additionally, if other offers were pending for the transaction offering, the users who made the other offers are notified that the transaction offering is no longer available. The notification may include links to other similar transactions offerings that are still available. In some embodiments, a user interface that includes a graphical representation of a handshake is generated. Beneficially, this handshake symbolizes the conclusion of the negotiations.

Alternatively, if the posting user does not accept the offer, the method proceeds to operation 894, where the posting user is prompted to decide whether to make a counter offer. If the posting user wishes to make a counter offer, the method proceeds to operation 896. Although the posting user may receive multiple offers from multiple other users, in at least some embodiments, the online marketplace 102 permits the posting user to enter into an active negotiation with only one user at a time. For example, the online marketplace 102 may permit the posting user to make only a single counter offer at a time. Other embodiments are possible as well.

At operation 896, the user (i.e., the browsing user or the posting user depending on the circumstances) is prompted to adjust the transaction terms for a counter offer to the other user. In at least some embodiments, a user interface is generated that displays all of the transaction terms and includes user interface elements to adjust at least some of the transaction terms. Additionally, in at least some embodiments, the user interface only permits the browsing user to adjust the terms of the transaction that the posting user has indicated are negotiable. In at least some embodiments, a browsing user may specify (or a posting user may request) that a certain number of the final payments in a payment plan will be pre-payed. For example, a browsing user may offer to pre-pay the final payment required under a proposed payment plan to make the offer more enticing. Alternatively, the browsing user may offer to pre-pay multiple (e.g., the last two, three, or more) of the final payments under the payment plan. Although there are many terms that can be specified in transactions, in at least some embodiments, the user can simply specify a payment price for immediate payment (e.g., a "Buy Now" option). In these transactions, the browsing user and the posting user do not need to agree to a payment plan.

At operation 898, the browsing user is prompted to enter a time limit for the offer to hold. In at least some embodiments, this operation is not performed as a default time limit or a time limit specified by the posting user is used instead.

At operation 900, the browsing user is prompted to review and accept the hold payment. In at least some embodiments, the browsing user is bound to make the hold payment if the posting user accepts it. Additionally, in at least some embodiments, the posting user species a hold amount and hold time period that pre-approved. In these embodiments, as soon as the browsing user confirms the hold payment, the payment is processed. The browsing user will then have until the hold time period elapses to agree to the transaction on the terms specified by the posting user.

Figure 12:
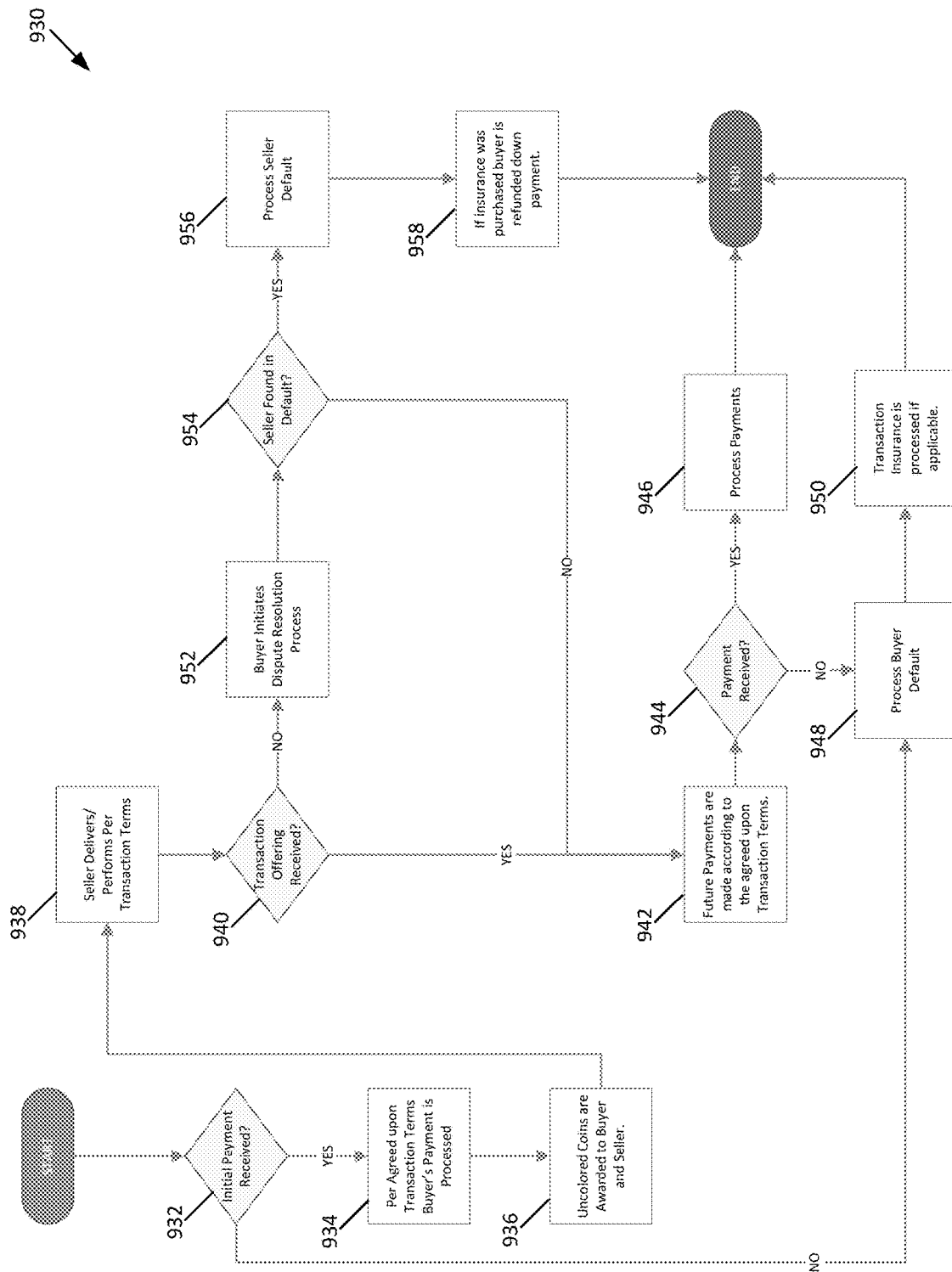
FIG. 12 is a flow chart illustrating an example method of processing a transaction using the system of FIG. 1.

FIG. 12 is a flow chart illustrating an example method 930 of processing a transaction using the system 100. For illustrative purposes, this method 930 is described in terms of a buyer and a seller. Buyers and sellers can include service providers and service acquirer as well as lenders/lessors and lendees, landlords and tenants, etc. In some embodiments, at least some operations of the method 930 are performed by the performed by the payment engine 300, the renegotiation engine 302, the reputation engine 304, and the insurance engine 306 using a processor (such as processing device 120, shown in FIG. 2). In this example, the method 930 includes operations 932, 934, 936, 938, 940, 942, 944, 946, 948, 950, 952, 954, 956, and 958.

At operation 932, it is determined whether the first payment is received from the buyer. In at least some embodiments, the payment is made to the online marketplace 102. The payment can be made using a variety of techniques, including credit card, debit card, bank account draft, payment service (e.g., Paypal, Google Pay, Amazon Payments, etc.), and virtual currency (e.g., Bitcoin) transfer. If the payment is received in accordance with the transaction terms, the method proceeds to operation 934. It not, the method proceeds to operation 948.

At operation 934, the payment is processed by the payment engine 300. In some embodiments, the payment engine 300 deducts fees for the online marketplace 102 from the payment and can divide those fees between the buyer and the seller. For example, fifty percent of the fee may be added on to the payment the buyer makes, while the remainder is subtracted from the payment the seller is to receive. In at least some embodiments, the payment less fees is deposited in the seller's bank account. In other embodiments, the fee is paid entirely by the seller or entirely by the buyer. Once the payment is processed, a notice of successful payment is communicated to both the buyer and the seller (e.g., via e-mail, text message, social media, voice mail, postal mail, etc.). Other embodiments are possible as well.

In some embodiments, payments are held by the online marketplace 102 (or another third party) for a predefined time period (e.g., 72 hours, a week, two weeks, or a month) or until the occurrence of a specific event (e.g., the transaction offering is delivered/performed, the buyer acknowledges satisfactory delivery/performance of the transaction offering, etc.). In this manner, some embodiments provide added security (e.g., "Deal Assurance") for the buyer that the seller will complete the transaction as agreed. In some embodiments, if the seller does not complete the transaction, the payment is returned to the buyer and the seller may be charged a non-compliance fee. In some embodiments, only the first payment is held by the online marketplace 102, and in other embodiments, additional (or all) payments are held by the online marketplace 102. For example, in some embodiments, payments may be received by the online marketplace 102 at any time, but are paid out to sellers on a weekly, bi-weekly, or monthly schedule.

Once the first payment is received, the buyer and seller may rate and review each other once. Alternatively, the buyer and seller can rate each other only after all payments have been made and the transaction is complete. The process for rating and reviewing users is described in more detail below. Additionally, in at least some embodiments, the buyer and seller may view additional personal information (e.g., contact information) about one another in the user profiles. In some embodiments, at least some of the personal information (e.g., contact information) is made available between the buyer and the seller only after the transaction has been entered into and a binding contract has been formed, such as to respect the privacy of the buyer's and the seller's personal information. Additionally, the transaction may be shown on a user interface in a list of open transactions. The list may include an amortization schedule and other information about the transaction. In some embodiments, either the buyer or the seller may propose a change to the transaction terms using the user interface. However, changes to the transaction terms only go into effect if both the buyer and seller indicate agreement to the change using the user interface.

At operation 936, uncolored transaction coins are awarded to the buyer and seller representing the transaction. The transaction coins will be colored in full when the transaction has been performed in full. Depending upon the total amount of the transaction, different types of transaction coins are awarded. The transaction coins are described in greater detail below.

At operation 938, the seller delivers or performs based on the transaction terms. In at least some embodiments, the seller can record a tracking number or other shipping or performance information for the transaction using the user interface. However, in at least some embodiments, the seller does not deliver the transaction offering until after all payments are completed. For example, some embodiments support layaway transactions, where the transaction offering is provided to the buyer after all payments have been made.

At operation 940, it is determined whether the buyer received the transaction offering in accordance with the transaction terms. In some embodiments, the buyer may indicate that the transaction offering was successfully received using the user interface. If the transaction offering is successfully received, the method proceeds to operation 942. If the transaction offering is not successfully received, the method proceeds to operation 952.

At operation 942, the future payments are made according to the transaction terms. In at least some embodiments, the future payments are made automatically based on a payment method specified by the buyer. In some embodiments, the payment method identifies a commerce account (e.g., a bank account, credit card, debit card, PayPal account, etc.) to use to make the payment. In some embodiments, the buyer may change payment methods one or more times throughout the transaction.

At operation 944, it is determined whether the payments were received. If the payments were received, the method proceeds to operation 946. If the payments were not received, the method proceeds to operation 948.

At operation 946, the payments are processed. In at least some embodiments, notifications are communicated to the buyer and seller each time a payment is successfully processed. Additionally, in at least some embodiments, upon completion of the final payment, the transaction coins awarded to the buyer and seller become fully colored.

At operation 948, the default by the buyer is processed. In at least some embodiments, notices are delivered to the buyer and seller regarding the default. Additionally, in some embodiments, the seller's transaction coin for the transaction is removed, while the buyer's transaction coin is tarnished to warn others that the buyer defaulted on this transaction. In some embodiments, the user interface provides tools for the buyer and the seller to privately work out a resolution to the default.

At operation 950, transaction insurance is applied if it is available. In this manner, the insurance may make some or all of the missing payments.

At operation 952, which is performed when the transaction offering is not received, the buyer initiates a dispute resolution process. In some embodiments, the buyer may use the user interface to send a message to the seller to resolve the dispute and the dispute may be privately resolved between the buyer and seller. Additionally, in some embodiments, the buyer uses the user interface to file a claim with a dispute resolution center of the online marketplace. A claim may be filed if the transaction offering is not delivered or performed in accordance with the transaction terms.

At operation 954, it is determined whether the seller is in default. The buyer and seller may submit information to the dispute resolution center using the user interface. In some embodiments, the online marketplace 102, may determine whether the seller performed and delivered or performed the transaction offering according to the transaction terms. If the seller is found to be in default, the method proceeds to operation 956. If the seller is not found to be in default, the method proceeds to operation 942.

At operation 956, the seller default is processed. Generally, the seller default is processed in a manner similar to the buyer default in operation 948. However the transaction coins are processed differently when the seller defaults. In at least some embodiments, the buyer's transaction coin for the transaction is removed, while the seller's transaction coin is tarnished to warn others that the seller defaulted on this transaction.

At operation 958, the buyer receives a refund of the down payment if insurance was purchased or applied to the transaction.

Figure 13:
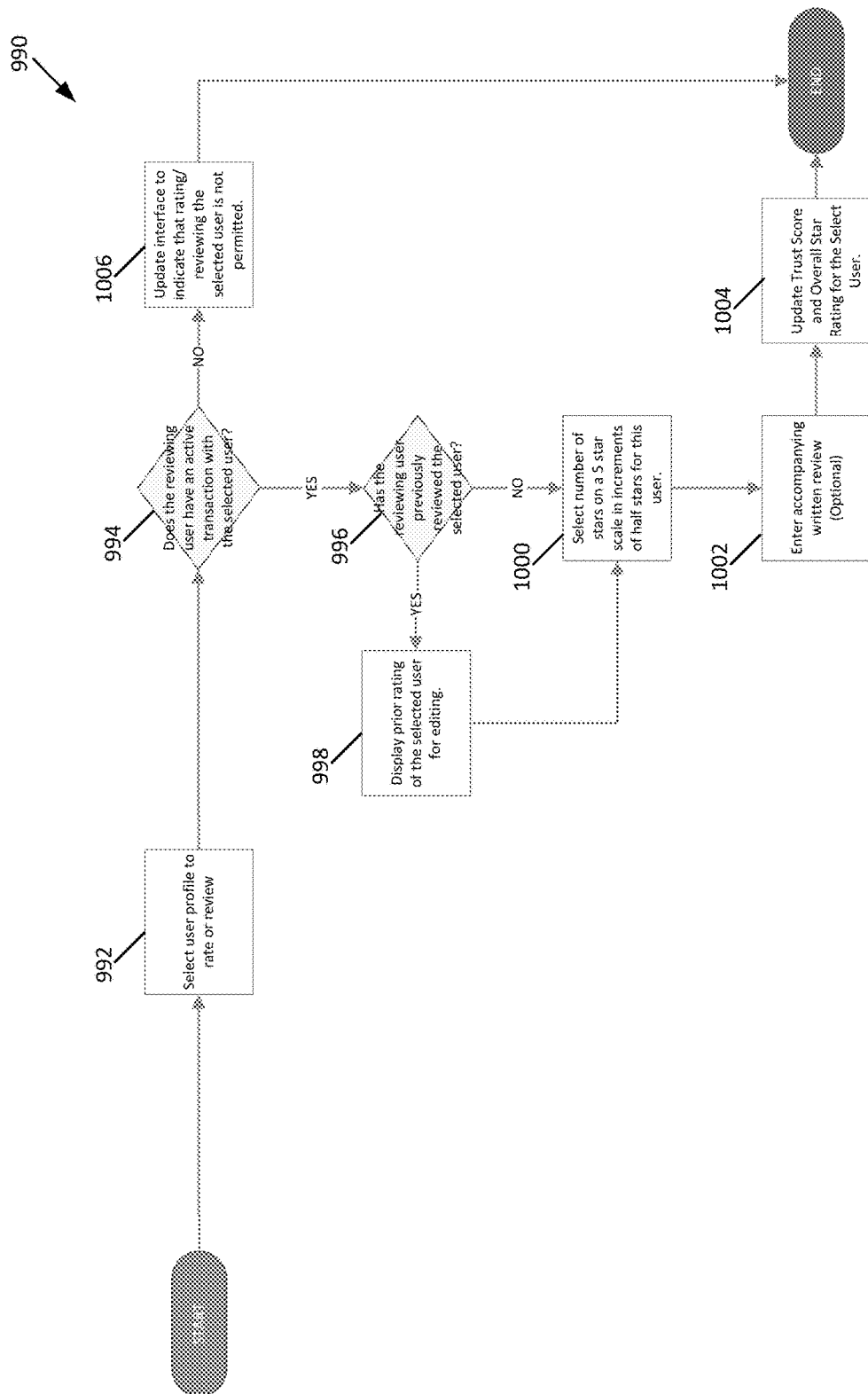
FIG. 13 is a flow chart illustrating an example method of rating a user using the system of FIG. 1.

FIG. 13 is a flow chart illustrating an example method 990 of rating a user using the system 100. In some embodiments, at least some operations of the method 990 are performed by the reputation engine 304 using a processor (such as processing device 120, shown in FIG. 2). In this example, the method 990 includes operations 992, 996, 998, 1000, 1002, 1004, and 1006.

At operation 992, the reviewing user selects a user to rate or review. In at least some embodiments, the reviewing user can select a user to review by following a link on a web page that lists all open transactions. Additionally, in some embodiments, the reviewing user can also follow a link that is displayed on a user profile web page or interface. After the reviewing user has entered into a transaction with another user, the reviewing user may rate and review may provide one rating for that user. In some embodiments, the rating and review may be edited over the life of the transaction. Alternatively, the rating and review may be edited any time a transaction is active between the rating user and the user. As yet another alternative, the rating and review may not be edited after it is entered in some embodiments. Other embodiments are possible as well.

At operation 994, it is determined whether the reviewing user has an active transaction with the selected user. In at least some embodiments, a transaction is considered active until all payments have been made. Alternatively, the transaction is considered active for a predetermined time period after the final payment is made. If it is determined that the reviewing user has an active transaction with the selected user, the method proceeds to operation 996. If instead, the reviewing user does not have an active transaction with the selected user, the method proceeds to operation 1006, where the interface is updated to indicate that rating reviewing the selected user is not currently permitted.

At operation 996, it is determined whether the reviewing user has previously rated the selected user. For example, to determine whether the reviewing user has previously rated the selected user, the transaction review data 368 in the database 110 can be queried for matching records. If the reviewing user has previously reviewed the selected user, the method proceeds to operation 998, where the prior rating and review is displayed in the interface so that it can be edited. If not, the method proceeds to operation 1000.

At operation 1000, the reviewing user provides a quantitative rating of the selected user. Examples of quantitative ratings include numeric scores and letter grade scores. In some embodiments, the quantitative rating is entered as a number of stars. The maximum number of stars can be five or it can be a different number.

At operation 1002, a written review is input. In some embodiments, the written review is optional. Additionally, some embodiments do not include a written review.

At operation 1004, the users trust score and average quantitative score is updated. For example, if the quantitative score is based on a star rating out of five stars. The users average quantitative score is updated based on the number of stars entered in operation 1002. The average quantitative score may be based on the average number of stars received over all transactions completed by the selected user since the account was created. Alternatively, the average quantitative score is based on the average number of stars received over all transactions completed during a specified time period (e.g., during the past six months). Additionally, the selected user's trust score is updated based on the rating entered in operation 1002.

Figure 14:
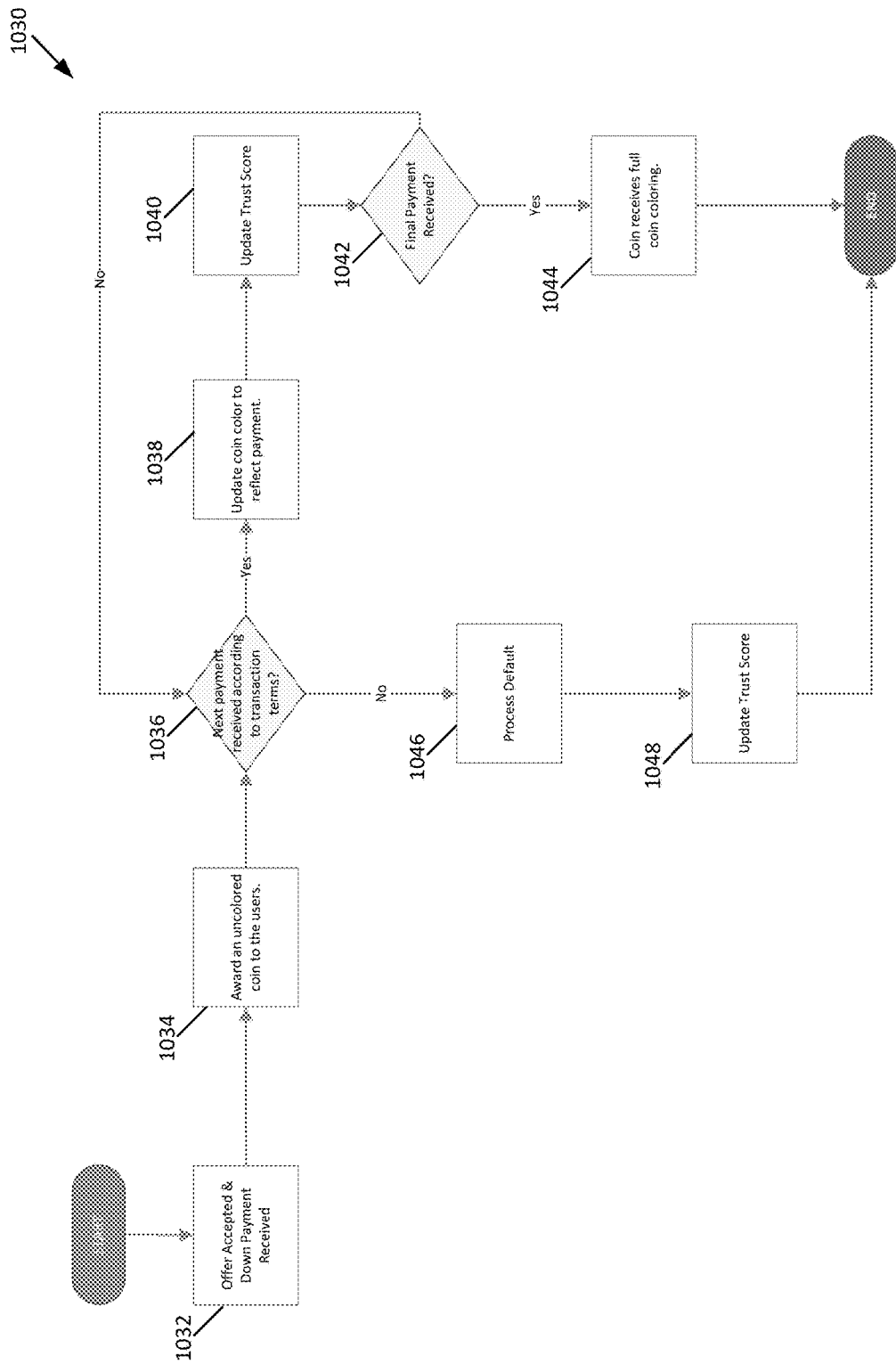
FIG. 14 is a flow chart illustrating an example method of generating and updating a transaction coin for a transaction using the system of FIG. 1.

FIG. 14 is a flow chart illustrating an example method 1030 of generating and updating a transaction coin for a transaction using the system 100. In some embodiments, at least some operations of the method 1030 are performed by the reputation engine 304 using a processor (such as processing device 120, shown in FIG. 2). In this example, the method 1030 includes operations 1032, 1034, 1036, 1038, 1040, 1042, 1044, 1046, and 1048.

In at least some embodiments, transaction coins are awarded to users to represent transactions in which the user has participated. Some embodiments award different types of transaction coins depending on the value of the transaction. For example, a transaction having a value of $0-250 is awarded a bronze transaction coin, a transaction having a value of $251-1500 is awarded a silver transaction coin, a transaction having a value of $1501-5000 is awarded a gold transaction coin, and a transaction having a value greater than $5000 is awarded a platinum transaction coin. In some embodiments, a user interface is generated for a user that displays the transaction coins that have been awarded to the user. An example user interface also includes a variety of additional profile information about the user. Beneficially, a second user can consider this profile information when deciding whether to enter into a transaction with the user.

In some embodiments, the user interface displays the various transaction coins awarded to a user in a color that represents the transaction coin type. Additionally, in at least some embodiments, the transaction coin type or a letter representing the transaction coin type is displayed on the user interface as well. Other indicia of transaction coin type are included in other embodiments as well. For example, the transaction coins may be grouped by transaction coin type under headings that indicate the transaction coin type. Additionally, in at least some embodiments, the user interface displays a letter on a transaction coin indicating the user's role in the transaction. For example, the letters B or S may be displayed on transaction coins to indicate that the user was a buyer or seller respectively.

In some embodiments, when a transaction coin is initially awarded it is not fully colored. The user interface may show the transaction coin in a transparent or partially transparent color. Then, as the transaction is performed, the transaction coin is colored in more. For example, the transaction coin can become less transparent as more of the transaction is performed. Alternatively, a portion of the transaction coin that corresponds to the portion of the transaction that has been completed can be colored. For example, when fifty percent of the payments required for a particular transaction have been made, fifty percent of the corresponding transaction coin can be colored in. Other embodiments are possible as well.

If one of the parties defaults during performance of the transaction, the transaction coin will be updated accordingly. In at least some embodiments, the user interface is updated to display a tarnished transaction coin for the party that breached. Additionally, in some embodiments, the transaction coin is simply removed from the non-defaulting user's profile. In at least some embodiments, a user may remove the tarnish from a transaction coin by resolving the default to the satisfaction of the other party. In these embodiments, the user interface is updated to display the transaction coin without a tarnish once the default is resolved. Alternatively, a user may remove a tarnished transaction coin by successfully performing a predetermined number (e.g., three) of transactions that each have a value equal to or greater than the value of the transaction associated with the tarnished transaction coin. In these embodiments, the tarnished transaction coin is simply not shown on the profile of the defaulting user after the tarnished transaction coin has been removed due to successful completion of additional transactions.

In some embodiments, when a predetermined quantity of types of transaction coins are accumulated, the user interface displays a sack of transaction coins. For example, the user interface may display a sack of transaction coins after a user receives five bronze transaction coins.

In at least some embodiments, the online marketplace also operates to allow users to make payments to other users or to pay fees using the transaction coins. For example, the transaction coins can operate as a virtual currency. Alternatively, the transaction coins can be traded in for a payment voucher. For example, ten bronze transaction coins could be traded in for a bronze level payment voucher. Other embodiments are possible as well.

At operation 1032, an offer from a first user is accepted by a second user and a down payment is made by the second user to the first user according to the transaction terms. At operation 1034, uncolored transaction coins are awarded to the users to indicate that the transaction has been entered. At operation 1036, it is determined whether the next payment was received according to the transaction terms. If so, the method proceeds to operation 1038. If not, the method proceeds to operation 1046, where the default is processed.

At operation 1038, the transaction coin colors are updated to reflect that the payment has been made. At operation 1040, the trust scores of the user are updated to reflect that the payments have been made. Trust scores are described in more detail below. At operation 1042, it is determined whether the final payment has been received. If so, the method proceeds to operation 1044, where the transaction coins are colored in full. If not, the method returns to operation 1036.

At operation 1046, the default is processed. In at least some embodiments, the transaction coin of the defaulting user is tarnished by the default and the transaction coin of the non-defaulting user is removed. At operation 1048, the trust scores of the users are updated to reflect the default.

Figure 15:
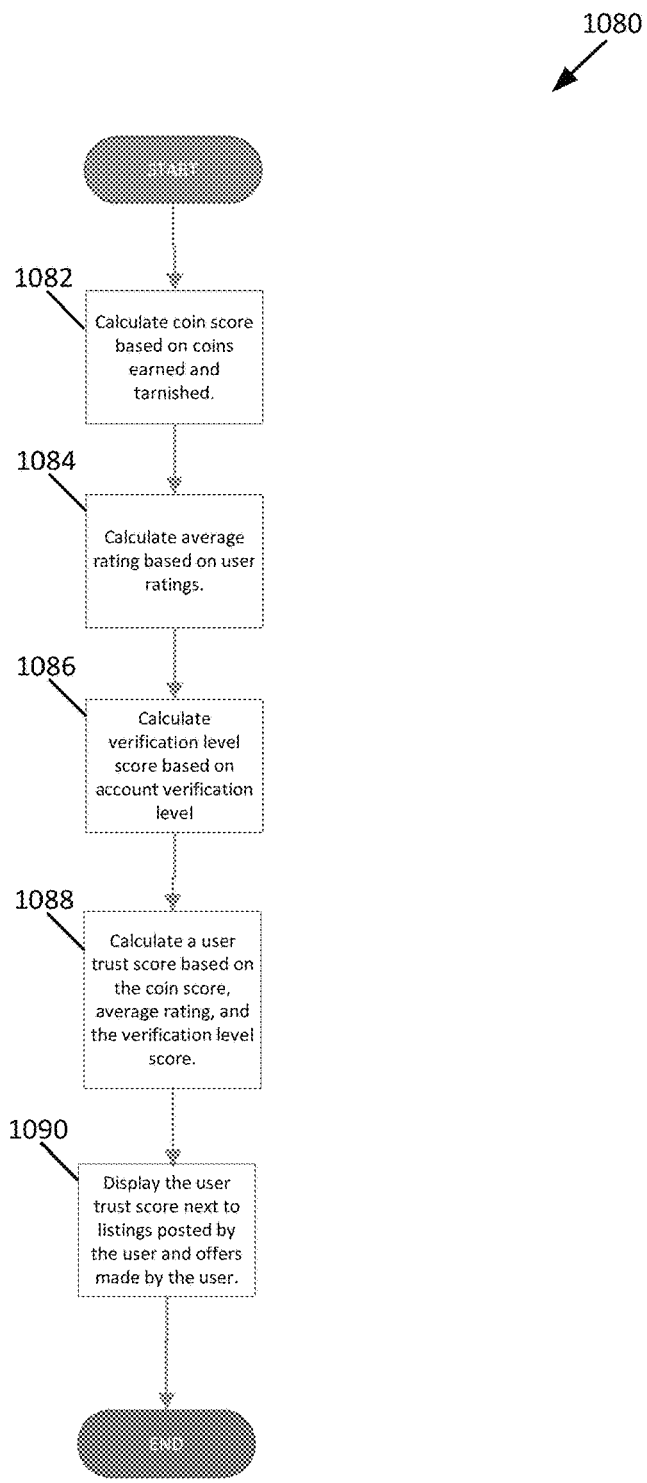
FIG. 15 is a flow chart illustrating an example method of calculating a user trust score using the system of FIG. 1.

FIG. 15 is a flow chart illustrating an example method 1080 of calculating a user trust score using the system 100. In some embodiments, at least some operations of the method 1080 are performed by the reputation engine 304 using a processor (such as processing device 120, shown in FIG. 2). In this example, the method 1080 includes operations 1082, 1084, 1086, 1088, and 1090.

At operation 1082, a transaction coin score is calculated for the user based on the number of transaction coins earned and the number of transaction coins tarnished. In at least some embodiments, the transaction coin score is based on the user's transactions since the user created an account with the online marketplace 102. Alternatively, the transaction coin score is based on the user's transaction in a particular time period (e.g., during the past two years). In at least some embodiments, the transaction coin score is based on the ratio of tarnished transaction coins to total transaction coins earned. Further, in some embodiments, the total number of transaction coins earned is also used in calculating the score or as a threshold. For example, the highest transaction coin score may be calculated when the user has no tarnished transaction coins and at least ten total transaction coins earned. Other embodiments are possible as well.

At operation 1084, the average rating based on user ratings is calculated. In some embodiments, the average rating is based on a simple average of all of the user ratings that the user has received. Alternatively, the average user rating is calculated as a weighted average of the user ratings. For example, the ratings may be weighted to give more recent ratings more weight than past ratings. Alternatively, ratings may be weighted based on the value of the transaction. As another alternative, the ratings may be weighted based on the rating of the user who provided the rating. In this manner, ratings from reputable users are weighted more heavily than from other users. Other embodiments are possible as well.

At operation 1086, a verification level score is calculated based on the verification information provided by the user. For example, a verification level score of one may be calculated if the user has been awarded a Silver Verified Badge and a verification level score of two may be calculated if the user has been awarded a Gold Verified Badge. In other embodiments, other values are assigned. Additionally, in some embodiments, other verification levels (badges) are used as well.

At operation 1088, the user trust score is calculated based on the transaction coin score calculated in operation 1082, the average rating calculated in operation 1084, and the verification level score calculated in operation 1086. In at least some embodiments, the transaction coin score, average rating, and verification level score are scaled and averaged. For example, the transaction coin score, average rating, and verification level score can be scaled to the range of 0-100. In this manner, the user trust score is based on an equal weighting of the transaction coin score, average rating, and verification level score. Alternatively, the transaction coin score, the average rating, and the verification level score are scaled and then combined with a weighted average. In some embodiments, the transaction coin score is weighted more heavily than the average user rating score, and the average user rating is weighted more heavily than the verification level score. For example, in at least some embodiments, the transaction coin score receives a 60% weighting, the average user rating score receives a 30% weighting, and the verification level score receives a 10% weighting. Other embodiments use different weightings. Additionally, in some embodiments, the user trust score is based on additional factors as well, such as data collected from various public or private sources. For example, in some embodiments, the user trust score is further adjusted based on data related to how long a user spends viewing or interacting with a particular section of the online marketplace 102. One or more of the following factors are also used by some embodiments to calculate that trust score: payment history for utility bills, number of e-mail addresses associated with the user and how long the user has had the e-mail addresses, and social reputation information from social media sites and various other public and private sources.

At operation 1090, the user trust score calculated in operation 1088 is displayed next to listings posted by the user and offers made by the user. Beneficially, this allows users interested in the listing to consider the trustworthiness of the user who posted the listing before entering into the transaction. Similarly, the user who posts the listing can evaluate the trustworthiness of the user who has sent an offer before accepting the offer. The trust score can help the posting user to determine whether to provide financing to the user making the offer. In at least some embodiments, the trust score is displayed along with the number of transactions that were used to calculate the trust score. For example, a trust score of 98/3 may be displayed to indicate a trust score of 98 has been earned over three transactions.

Figure 16:
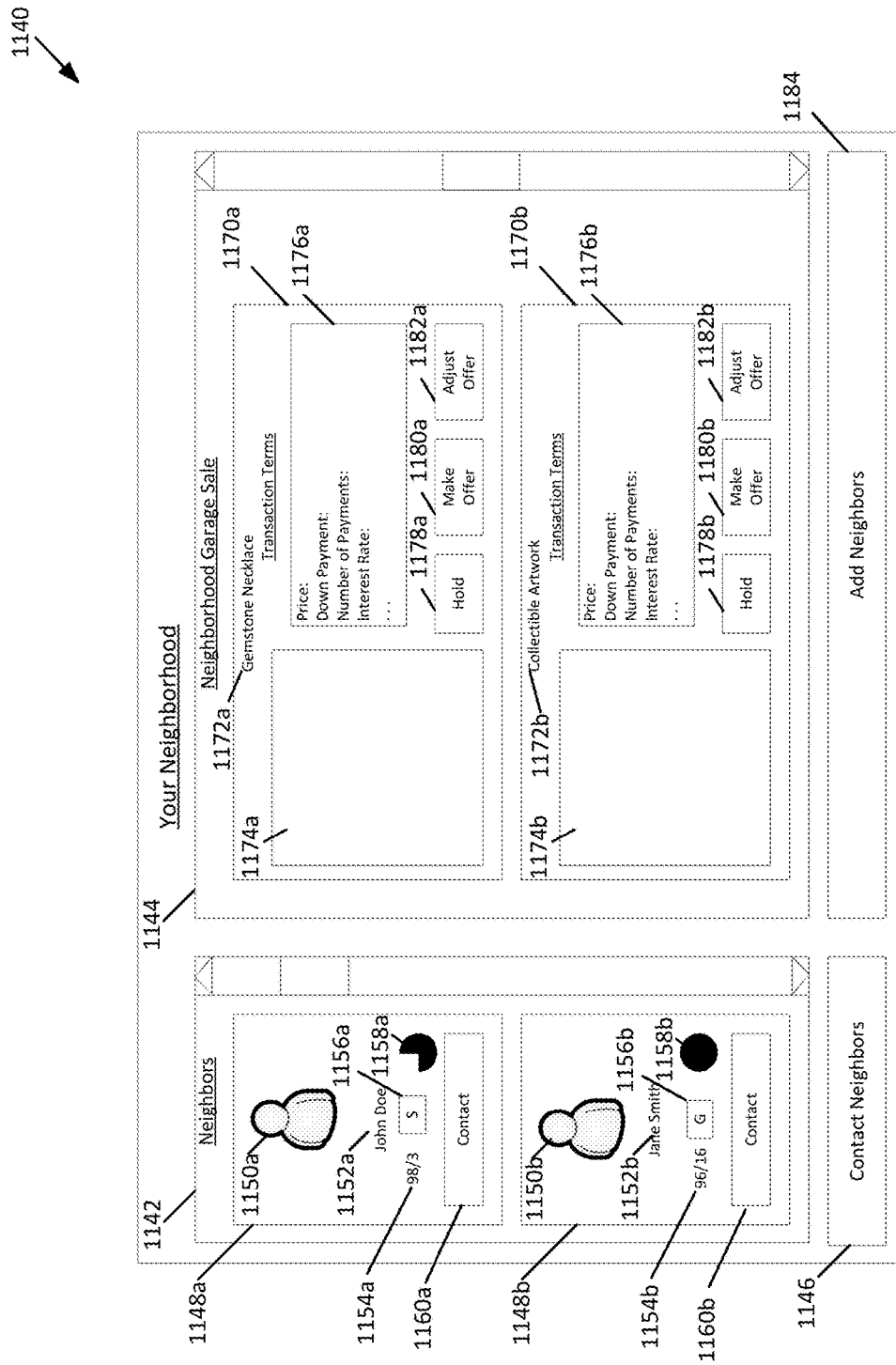
FIG. 16 is a block diagram illustrating an example layout of a neighborhood interface generated by some embodiments of the neighborhood engine and the user interface engine of FIG. 4.

FIG. 16 is a block diagram illustrating an example layout of a neighborhood interface 1140 generated by the neighborhood engine 308 and the user interface engine 312. The neighborhood interface 1140 includes a neighbors list 1142, an offerings list 1144, a contact neighbors element 1146, and an add neighbors element 1184.

The neighbors list 1142 operates to show some or all of the other users of the online marketplace 102 that have been added to the neighborhood of a user. Users are added to neighborhoods after accepting a neighbor request, such as a "will you be my neighbor?" request. Users may invite other users or even non-users to be neighbors. If a user invites a non-user to be a neighbor and the non-user accepts, the user may receive an incentive from the online marketplace 102 such as a voucher that can be used to make payments for fees or transaction offerings on the online marketplace 102. Users can send neighbor invites in various ways, such as while viewing the profile of another user or through various social media accounts. Other embodiments are possible as well.

In this example, the neighbors list 1142 shows the neighbor profiles 1148*a* and 1148*b*. In this example, the neighbors list 1142 includes a scroll or swipe capability to show additional neighbors. Other embodiments are possible as well.

The neighbor profiles 1148*a* and 1148*b* include photo elements 1150*a* and 1150*b*, name elements 1152*a* and 1152*b*, trust score elements 1154*a* and 1154*b*, verification level badge elements 1156*a* and 1156*b*, transaction coins elements 1158*a* and 1158*b*, and contact elements 1160*a* and 1160*b*. In at least some embodiments, the neighbor profiles 1148*a* and 1148*b* include more, fewer, or different elements.

The photo elements 1150*a* and 1150*b* optionally show a photograph of the user that the user has uploaded. The name elements 1152 and 1152*b* show the name of the user.

The trust score elements 1154*a* and 1154*b* show the trust score of the user. In this example, the trust score element 1154*a* shows a trust score of "98/3," which indicates a trust score of 98 has been earned over three transactions. The trust score element 1154*b* shows a trust score of "96/6," which indicates a trust score of 96 has been earned over sixteen transactions. Additionally, in some embodiments, the trust score elements 1154*a* and 1154*b* are user interface elements that can be activated (e.g., by clicking or touching) and used to view the individual components and transaction data that was used to calculate the trust score.

The transaction coins elements 1158*a* and 1158*b* show the transaction coins that have been earned by the user. In this example, the transaction coins element 1158*a* shows a transaction coin that is only partially complete, which indicates that the transaction represented by the transaction coin is ongoing and only partially complete. The transaction coins element 1158*b* shows a transaction coin that is complete, which indicates that the transaction represented by the transaction coin is complete. Although only a single transaction coin is shown in each of the transaction coins elements 1158*a* and 1158*b*, in other embodiments multiple transaction coins are shown.

The contact elements 1160*a* and 1160*b* are user interface elements that can be activated to contact the user. In some embodiments, activating the contact elements 1160*a* and 1160*b* opens a form which can be used to send a message to the user. In some embodiments, the message is sent using e-mail, text messaging, or social media. Additionally, in some embodiments, the message is sent to an inbox for the user within the online marketplace 102. The contact elements 1160a and 1160b can be used to send messages to solicit a neighbor to buy or sell a particular transaction offering. Additionally, the contact elements 1160a and 1160b can also be used to solicit a neighbor to help pay for an offering as a third-party payer. Beneficially, this can be used to purchase a particular transaction offering for a charity, friend, or family member.

The offerings list 1144 operates to show some or all of the transaction offerings available from users in the neighborhood. In this example, the offerings list 1144 shows transaction offering panels 1170a and 1170b. In this example, the offerings list 1144 includes a scroll or swipe capability to show additional offerings from neighbors. Other embodiments are possible as well. Additionally, in some embodiments, the offerings list 1144 includes user interface elements filter or search the offerings in the list.

The transaction offering panels 1170a and 1170b include title elements 1172a and 1172b, photo elements 1174a and 1174b, transaction terms elements 1176a and 1176b, hold elements 1178a and 1178b, make offer elements 1180a and 1180b, and adjust offer elements 1182a and 1182b. In at least some embodiments, the transaction offering panels 1170a and 1170b include more, fewer, or different elements. For example, the transaction offering panels 1170a and 1170b can also include a detailed description or a user interface element that can be used to access the detailed description and information about the user who listed the offering.

The title elements 1172a and 1172b display the title of the transaction offering that was entered by the user who listed it. The photo elements 1174a and 1174b display one or more photographs, if any have been uploaded, of the offering.

The transaction terms elements 1176a and 1176b show the transaction terms that the user entered. In at least some embodiments, the transaction terms elements 1176a and 1176b also include indicia (e.g., different fonts, colors, text styles, asterisks, etc.) of whether the user who posted the offering is willing to consider counter offers on the particular terms.

The hold elements 1178a and 1178b are user interface elements that can be activated to hold the offering. Holding an offering has been described in greater detail above. The make offer elements 1180a and 1180b are user interface elements that can be activated to make an offer on the offering. The adjust offer elements 1182a and 1182b are user interface elements that can be activated to adjust one or more of the proposed transaction terms for the offering before making an offer. Making and adjusting offers on an offering has been described in greater detail above.

The contact neighbors element 1146 operates to send a message to all neighbors of a particular user. Similar to the contact elements 1160a and 1160b described above, the contact neighbors element 1146 can be used to solicit neighbors as a group to buy or sell a particular transaction offering. Additionally, the contact neighbors element 1146 can be used to solicit neighbors to make a payment on behalf of a third party such as a charity, friend, or family member. In at least some embodiments, unsolicited communication is only permitted between neighbors. Further, in some embodiments, the neighborhood interface 1140 includes an element that the user can use to remove or hide a particular other user from the neighborhood and thus stop receiving unsolicited communication from that other user.

The add neighbors element 1184 operates to add a user as a neighbor. In some embodiments, the add neighbors element 1184 display a search form when it is activated that can be used to identify potential neighbors. Additionally, in some embodiments, when a potential neighbor is identified, a user can send a "Will you be my neighbor?" request to the potential neighbor. In some embodiments, the potential neighbor is not added to the neighborhood until the potential neighbor accepts the request. In at least some embodiments, neighbors can be added using other interfaces as well. For example, some embodiments include a user interface element to add a user to the neighborhood that is displayed on the profile page of a potential neighbor or another location. As described above, the user may receive an incentive when a non-user creates an account with the online marketplace 102.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A server comprising:
a processor; and
memory storing instructions that, when executed by the processor, cause the server to:
generate a user trust profile;
receive, from an external computing system, a request to create a transaction offering including proposed transaction terms, the proposed transaction terms including a price and at least two payments to be made over a period of time;
receive an offer for the transaction offering;
provide the offer to the external computing system via an offer message having a link;
transmit the user trust profile to the external computing system responsive to the external computing system following the link in the offer message, wherein the user trust profile is transmitted separately from the offer message; and
in response to receiving, from the external computing system, an acceptance of the offer, create a payment plan for the transaction offering.

2. The server of claim 1,
wherein the external computing system is an e-commerce website; and
wherein communicating with the e-commerce website is performed via a web application programming interface.

3. The server of claim 1, wherein the external computing system is a point-of-sale system of a store or a social media application.

4. The server of claim 1, wherein the offer message is sent via e-mail or text.

5. The server of claim 1, wherein the payment plan for the transaction offering is defined based on the proposed transaction terms, and wherein the payment plan includes the at least two payments to be made over the period of time.

6. The server of claim 1, wherein the acceptance of the offer is automatically sent by the external computing system in response to determining that a trust score of the user trust profile is above a pre-defined minimum trust score.

7. The server of claim 1,
wherein receiving the offer for the transaction offering comprises receiving counter transaction terms for the transaction offering; and wherein providing the offer to the external computing system via the offer message having the link comprises providing the counter transaction terms to the external computing system.

8. The server of claim 1, wherein receiving, from the external computing system, the request to create the transaction offering is performed after a selection of a seller-financed payment option offered by the external computing system.

9. The server of claim 1, wherein the instructions, when executed by the processor, further cause the server to provide the payment plan to the external computing system for order fulfillment.

10. The server of claim 1, wherein the instructions, when executed by the processor, further cause the server to send periodic updates to the external computing system about the payment plan.

11. The server of claim 1, wherein the user trust profile includes a user trust score reflective of all seller-financed transactions entered into by a user.

12. The server of claim 1,
wherein the instructions, when executed by the processor, further cause the server to receive, from a lender computing system, an agreement to pay on behalf of a user; and
wherein providing the offer to the external computing system comprises providing an indication of the agreement from the lender computing system to pay on behalf of the user.

13. The server of claim 1, wherein the payment plan indicates that a virtual currency associated with the server is to be used for the at least two payments to be made over the period of time.

14. The server of claim 1,
wherein the offer for the transaction offering is input by a user into the external computing system; and
wherein receiving, from the user, the offer for the transaction offering comprises receiving the offer from the external computing system.

15. A system for facilitating seller-financed transactions, the system comprising:
an server;
an external computing system; and
a user computing device;
wherein the server is configured to:
from the external computing system, receive, at an endpoint of an interface of the server, a request for creation of a transaction offering that includes at least two proposed payments to be made over a period of time;
from the user computing device, receive an offer for the transaction offering;
provide the offer to the external computing system via an offer message having a link;
transmit a user trust profile to the external computing system responsive to a selection of the link in the offer message, wherein the user trust profile is transmitted separately from the offer message; and
in response to receiving, from the external computing system, an acceptance of the offer, create a payment plan between a user and the external computing system for the transaction offering.

16. The system of claim 15, wherein the external computing system is an e-commerce website or an e-commerce mobile application external to the server.

17. The system of claim 15, wherein the interface of the server is configured to receive a counteroffer for the transaction offering.

18. The system of claim 15,
further comprising a plurality of user computing devices;
wherein the offer for the transaction offering comprises a plurality of offers from the plurality of computing devices, the plurality of computing devices belonging to a neighborhood, and the plurality of computing devices submitting the plurality of offers to buy the transaction offering as a group.

19. A method of facilitating seller-financed transactions, the method comprising:
generating a user trust profile;
receiving, from an external computing system, a request to create a transaction offering including proposed transaction terms, the proposed transaction terms including a price and at least two payments to be made over a period of time;
receiving, from a user computing device, an offer for the transaction offering;
providing the offer to the external computing system via an offer message having a link;
transmitting the user trust profile to the external computing system responsive to the external computing system following the link in the offer message, wherein the user trust profile is transmitted separately from the offer message; and
in response to receiving, from the external computing system, an acceptance of the offer, create a payment plan for the transaction offering.

* * * * *